(12) United States Patent
Watanabe

(10) Patent No.: US 12,003,882 B2
(45) Date of Patent: Jun. 4, 2024

(54) INFORMATION PROCESSING DEVICES, METHODS, AND COMPUTER-READABLE MEDIUM FOR PERFORMING INFORMATION PROCESSING TO OUTPUT VIDEO CONTENT USING VIDEO FROM MULTIPLE VIDEO SOURCES INCLUDING ONE OR MORE PAN-TILT-ZOOM (PTZ)-ENABLED NETWORK CAMERAS

(71) Applicant: CONTENTRIGHTS LLC, Tokyo (JP)

(72) Inventor: Kazuhiro Watanabe, Tokyo (JP)

(73) Assignee: CONTENTSRIGHTS LLC, Tokyo (JP)

( * ) Notice: Subject to any disclaimer, the term of this patent is extended or adjusted under 35 U.S.C. 154(b) by 0 days.

(21) Appl. No.: 18/011,040

(22) PCT Filed: Aug. 2, 2021

(86) PCT No.: PCT/JP2021/028523
§ 371 (c)(1),
(2) Date: Dec. 16, 2022

(87) PCT Pub. No.: WO2022/034814
PCT Pub. Date: Feb. 17, 2022

(65) Prior Publication Data
US 2023/0199138 A1    Jun. 22, 2023

(30) Foreign Application Priority Data

Aug. 11, 2020 (JP) .................................. 2020-135599
Sep. 30, 2020 (JP) .................................. 2020-164204

(51) Int. Cl.
*H04N 5/268* (2006.01)
*H04N 21/218* (2011.01)
(Continued)

(52) U.S. Cl.
CPC ....... *H04N 5/268* (2013.01); *H04N 21/21805* (2013.01); *H04N 21/854* (2013.01);
(Continued)

(58) Field of Classification Search
None
See application file for complete search history.

(56) References Cited

U.S. PATENT DOCUMENTS 6,456,335 B1 * 9/2002 Miura .................. H04N 5/2624
348/E7.086
8,917,309 B1 * 12/2014 Westin .................. H04N 7/147
709/204
(Continued)

FOREIGN PATENT DOCUMENTS

EP         3528469 A1    8/2019
JP      2009-200964 A    9/2009
(Continued)

OTHER PUBLICATIONS

International Application No. PCT/JP2021/028523, International Search Report and Written Opinion, dated Sep. 28, 2021.
(Continued)

*Primary Examiner* — Edemio Navas, Jr.
(74) *Attorney, Agent, or Firm* — MARSHALL, GERSTEIN & BORUN LLP

(57) ABSTRACT

The present invention is an information processing device that performs information processing to output (produce and distribute) video content using video from multiple video sources including network cameras, the information processing device comprising: a switching means for performing switching based on video signals transferred by the transfer method used to transfer data without confirming reception by the receiving node with the transmitting node at the video source; and an information processing means
(Continued)

that outputs (produces and distributes) video content based on information indicating which video source was switched at what time by the switching means and based on video data outputted from the video sources.

8 Claims, 16 Drawing Sheets

(51) Int. Cl.
    *H04N 21/854*    (2011.01)
    *H04N 23/63*    (2023.01)
    *H04N 23/661*    (2023.01)
    *H04N 23/69*    (2023.01)
    *H04N 23/695*    (2023.01)

(52) U.S. Cl.
    CPC ......... *H04N 23/631* (2023.01); *H04N 23/661* (2023.01); *H04N 23/69* (2023.01); *H04N 23/695* (2023.01)

(56) References Cited

U.S. PATENT DOCUMENTS

| | | | | |
|---|---|---|---|---|
| 2003/0234885 A1* | 12/2003 | Pilu | .................... | H04N 23/6812 |
| | | | | 348/333.01 |
| 2008/0165864 A1* | 7/2008 | Eleftheriadis | ...... | H04N 21/6377 |
| | | | | 375/E7.199 |
| 2009/0214179 A1 | 8/2009 | Nagasaki | | |
| 2011/0228715 A1* | 9/2011 | Tsuji | .................. | H04N 21/2404 |
| | | | | 370/310 |
| 2013/0223820 A1 | 8/2013 | Ueda | | |
| 2014/0101700 A1* | 4/2014 | Sheeley | ................. | H04N 23/66 |
| | | | | 725/41 |
| 2015/0381901 A1* | 12/2015 | Masuda | ................. | H04N 5/268 |
| | | | | 348/705 |
| 2016/0227128 A1* | 8/2016 | Um | ................... | G08B 13/19641 |
| 2017/0213577 A1 | 7/2017 | Wagner et al. | | |
| 2018/0160025 A1* | 6/2018 | Pallanti | ................. | G01S 3/7864 |
| 2018/0352305 A1 | 12/2018 | Bowen et al. | | |

FOREIGN PATENT DOCUMENTS

| | | | |
|---|---|---|---|
| JP | 2009-200965 A | 9/2009 | |
| JP | 2009-200966 A | 9/2009 | |
| JP | 2015-041800 A | 3/2015 | |
| JP | 2017-163538 A | 9/2017 | |
| JP | 2017-208702 A | 11/2017 | |
| JP | 2017-536021 A | 11/2017 | |
| WO | WO-2016/132864 A1 | 8/2016 | |
| WO | WO-2018/060488 A1 | 4/2018 | |

OTHER PUBLICATIONS

International Application No. PCT/JP2021/028523, International Preliminary Report on Patentability, dated Apr. 8, 2022.
European Application No. 21855893.0, Extended European Search Report, dated Jan. 17, 2024.
Cisco, "Deploying Network Services for IP Video Surveillance, Chapter 6," Aug. 18, 2009, Retrieved from the Internet: <http://www.cisco.com/c/en/us/td/docs/solutions/Enterprise/Video/IPVS_DG/IPVS- DesignGuide/IPVSchap6.pdf <https://protect-us.mimecast.com/s/THpYC9r3n0CR13PzhE2ITH> (Last accessed May 25, 2016).
Examination Report No. 1 issued in Australian Patent Application No. 2023203194 dated Mar. 27, 2024.

* cited by examiner

[Fig. 1]
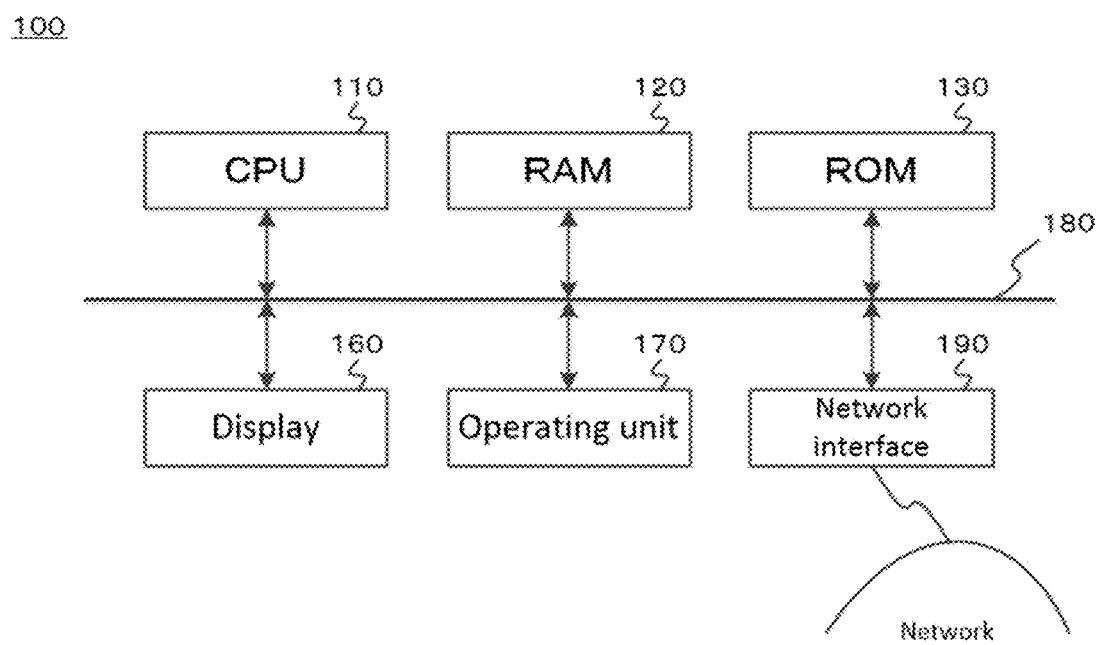

[Fig. 2]
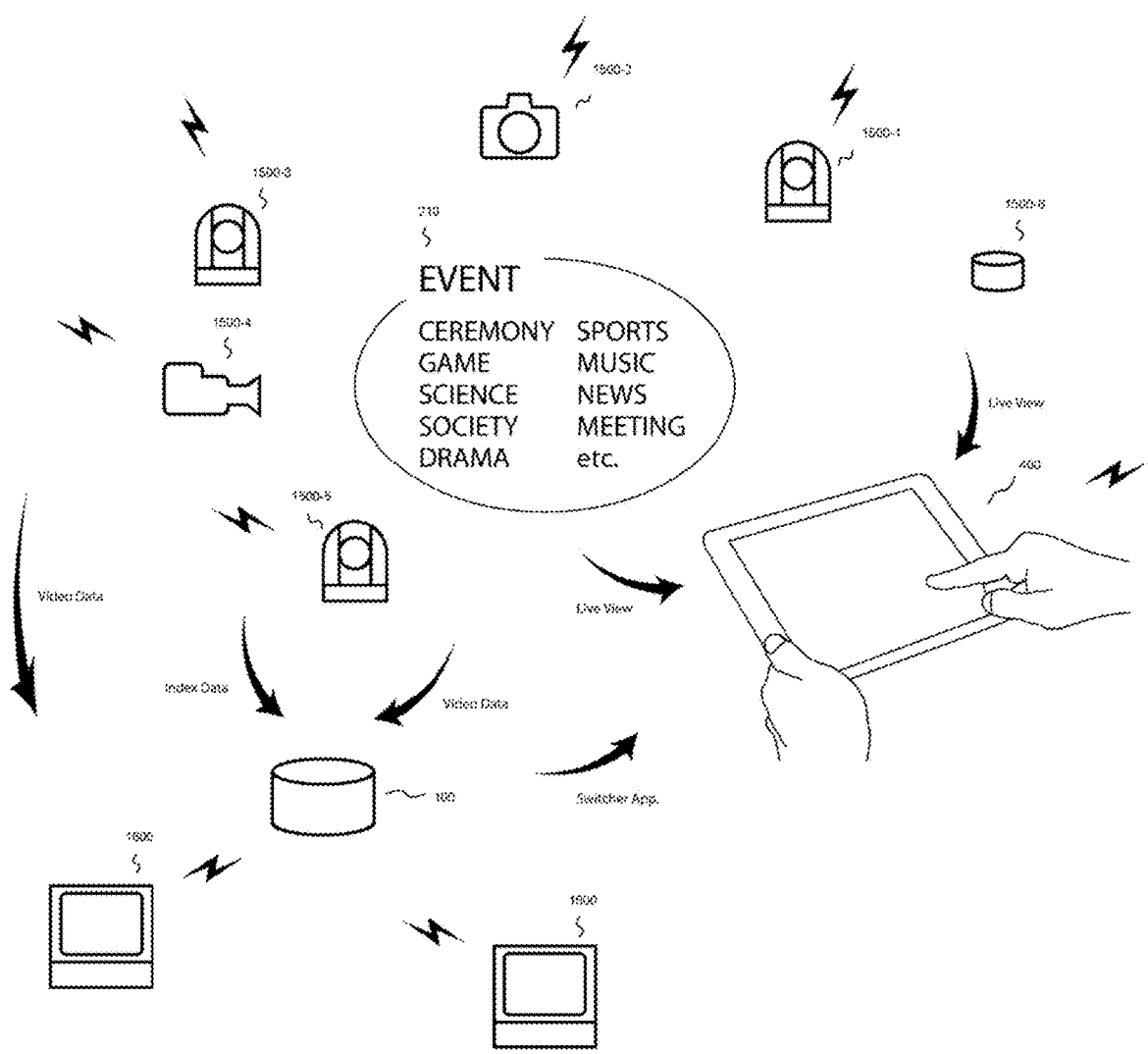

[Fig. 3]
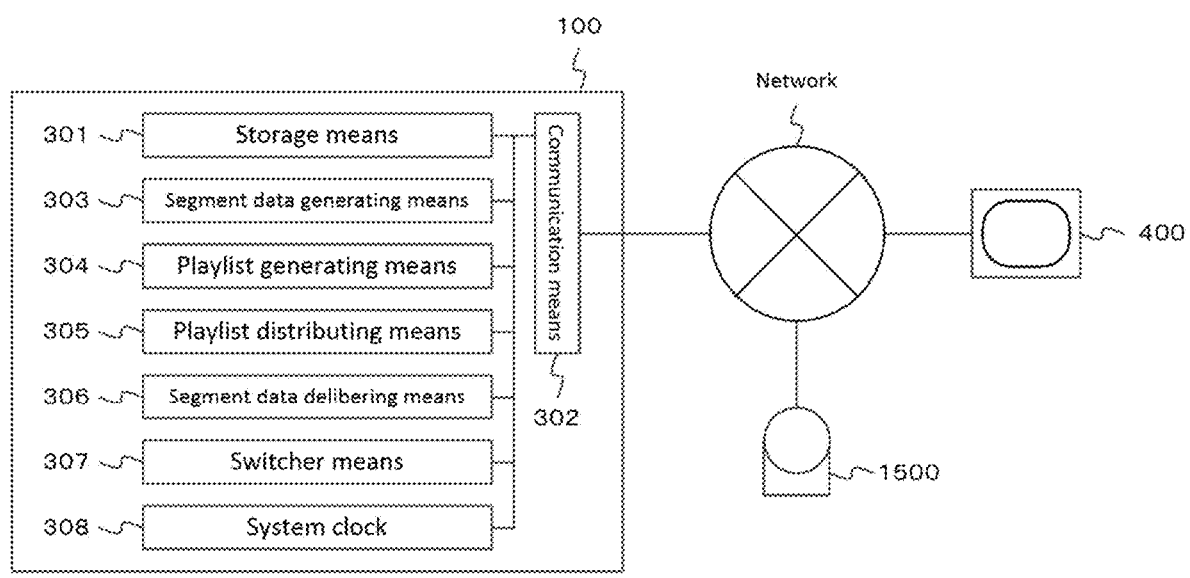

[Fig. 4]
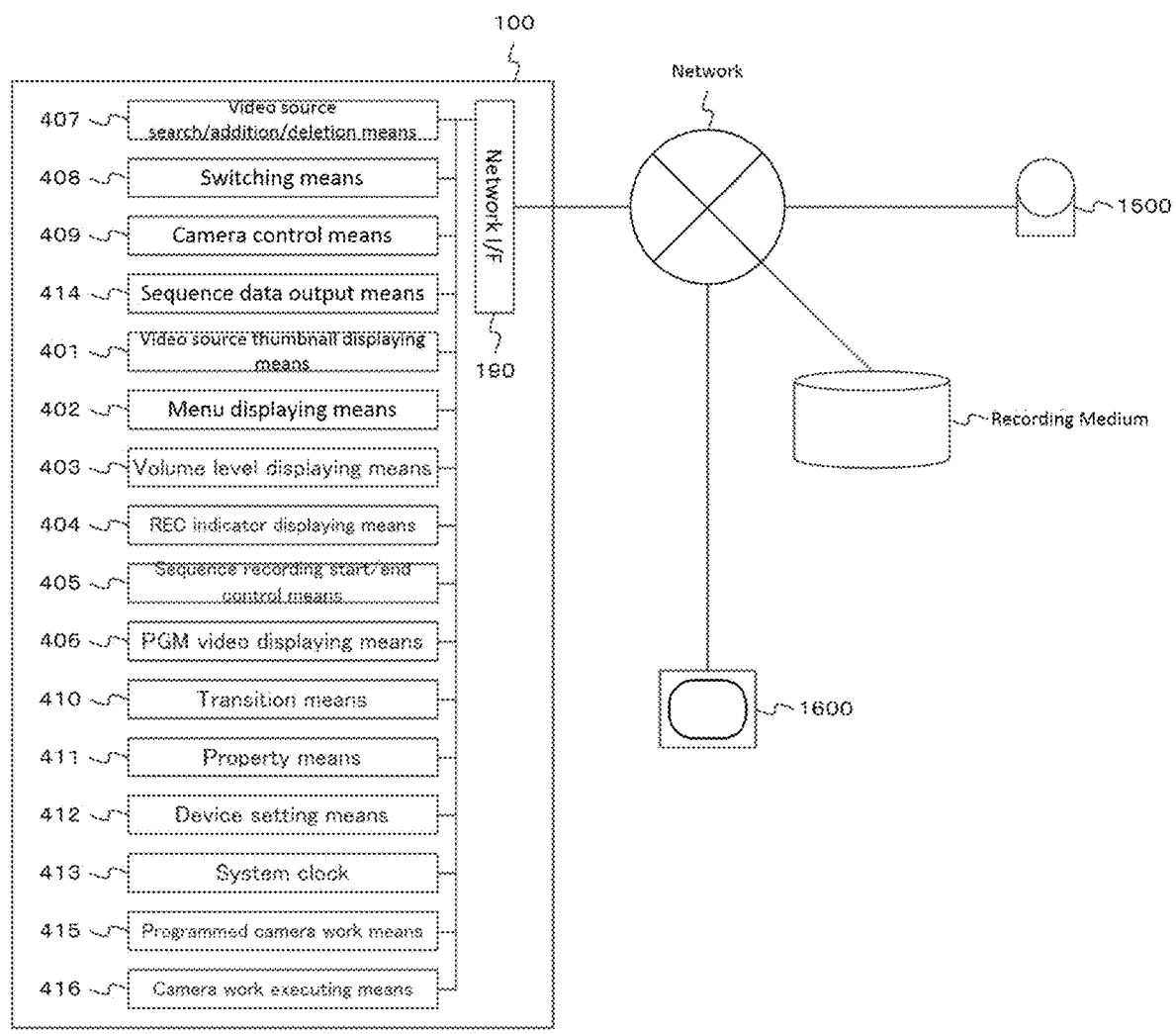

[Fig. 5]
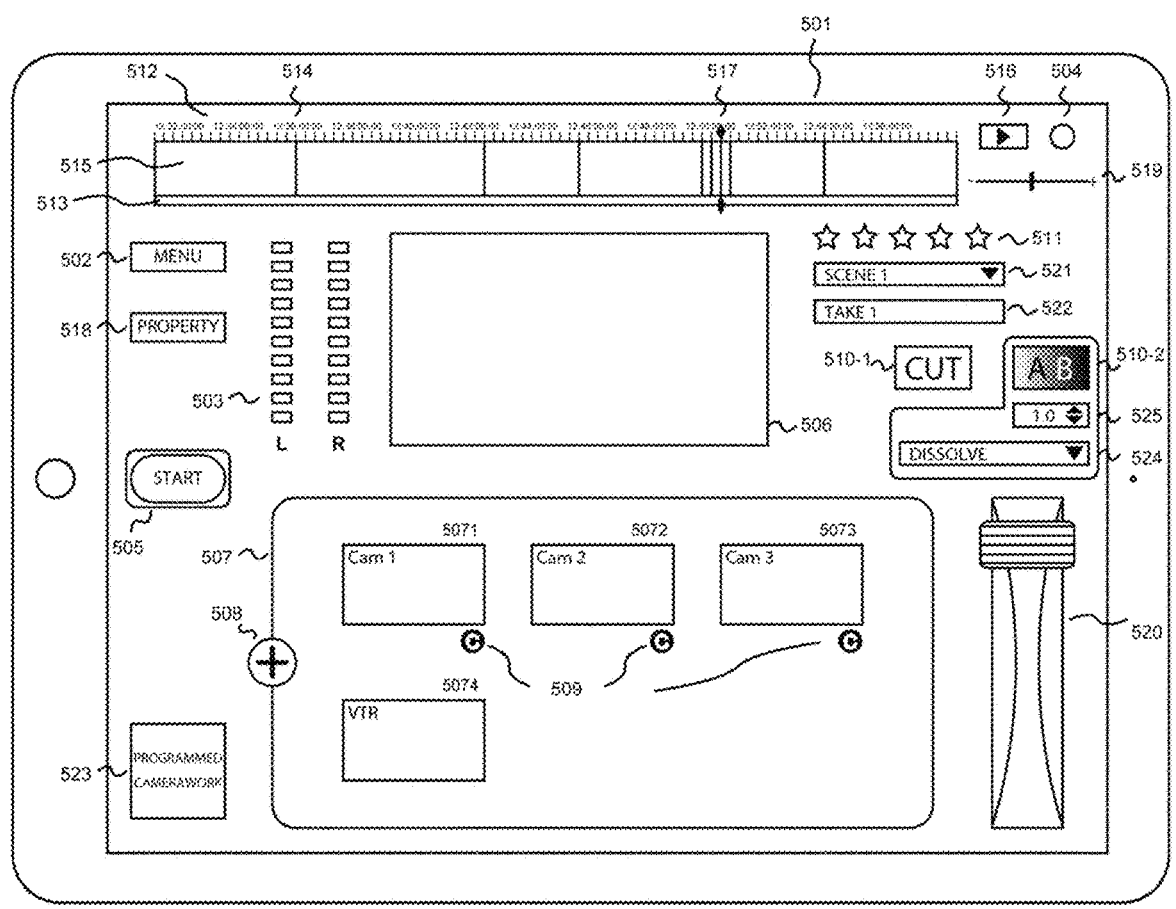

[Fig. 6]
(a)
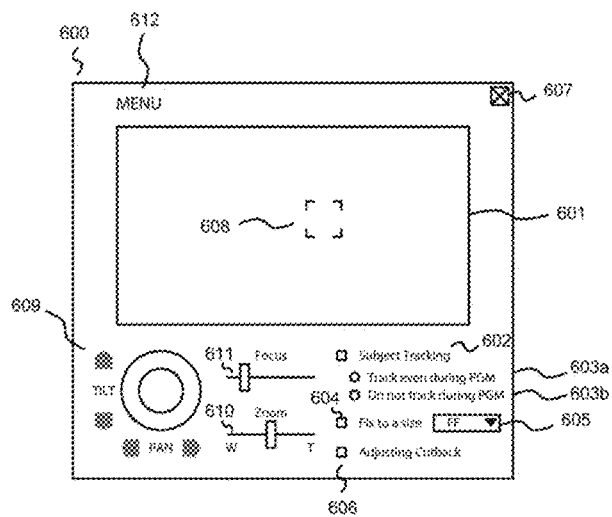
(b)
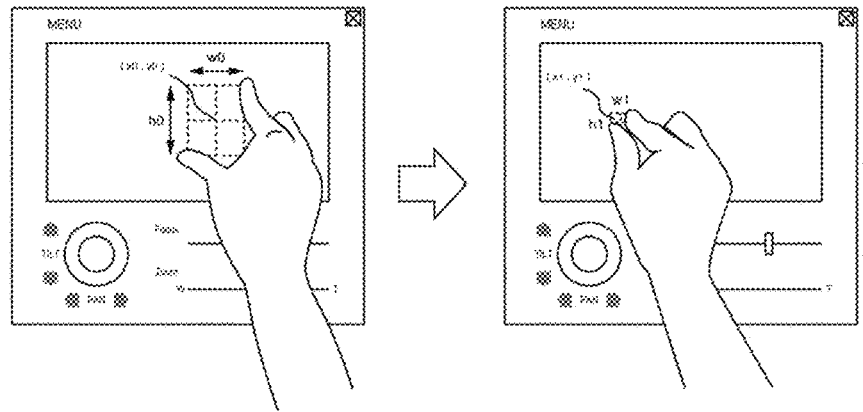
(c)
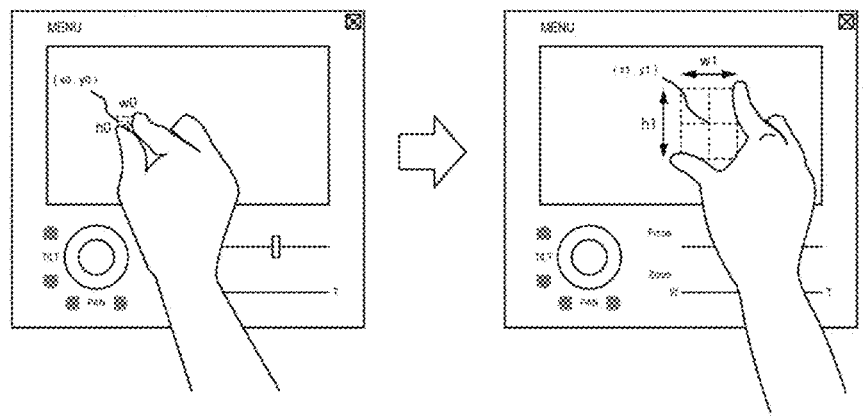

[Fig. 7]
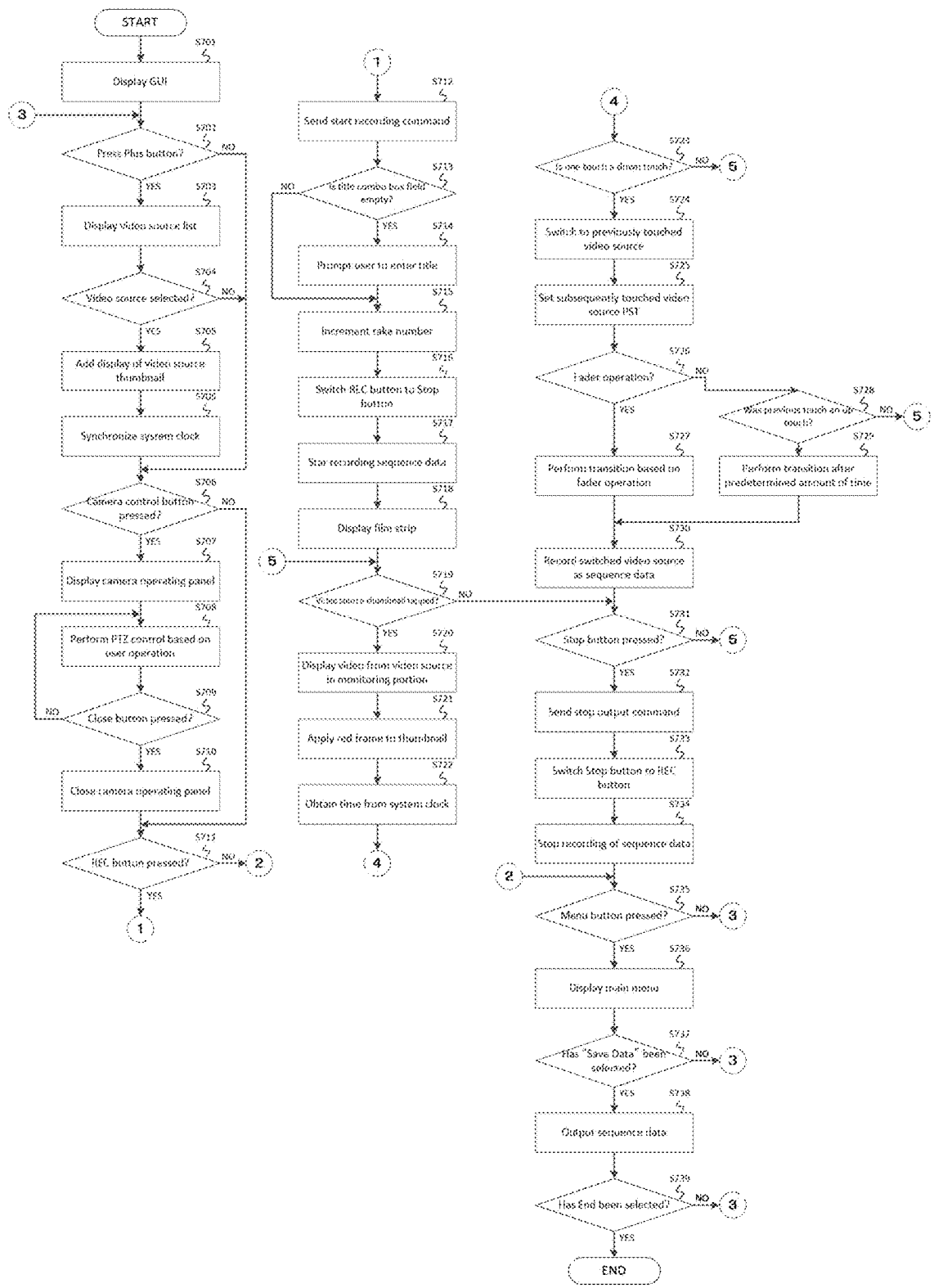

[Fig. 8]
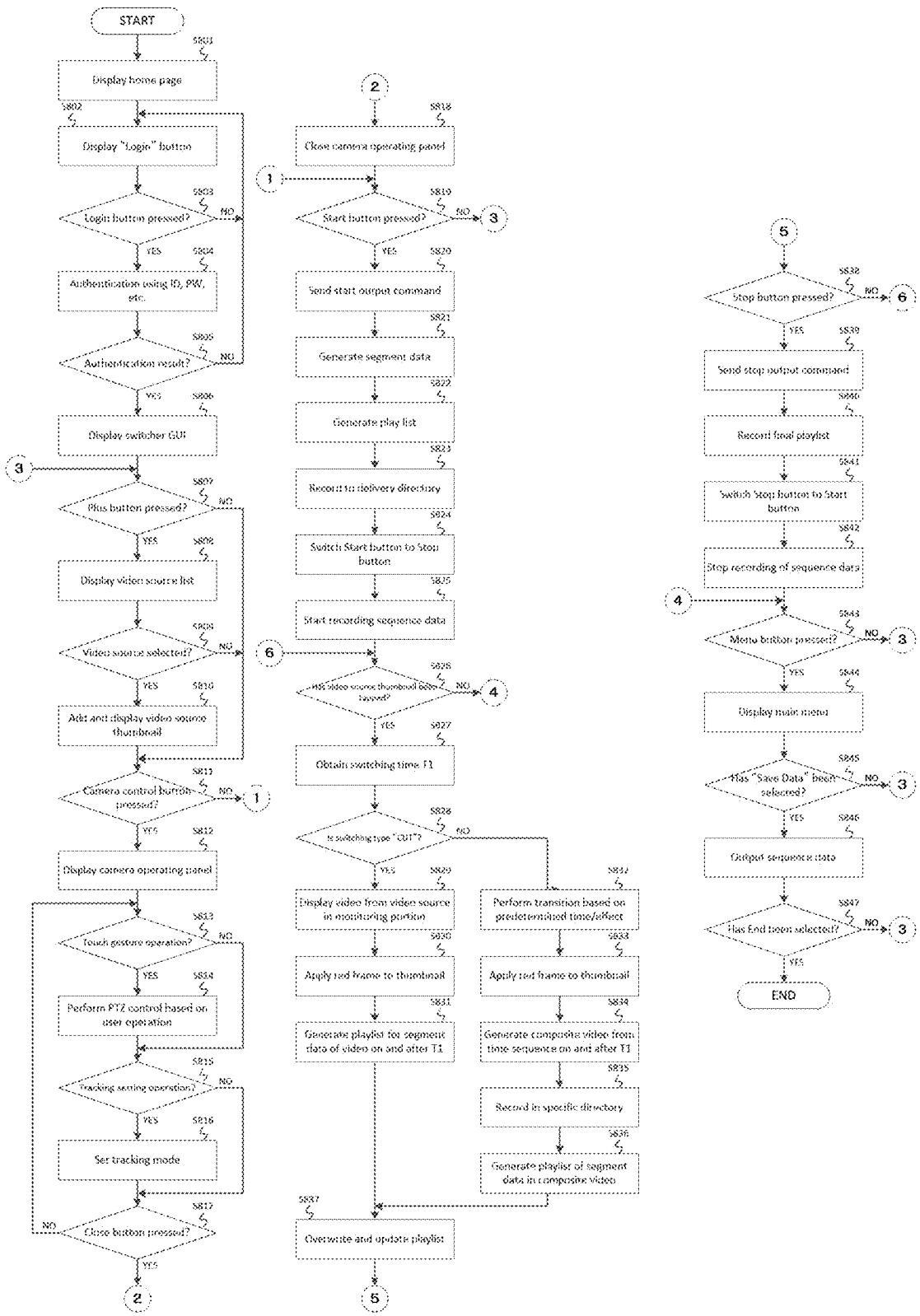

[Fig. 9]
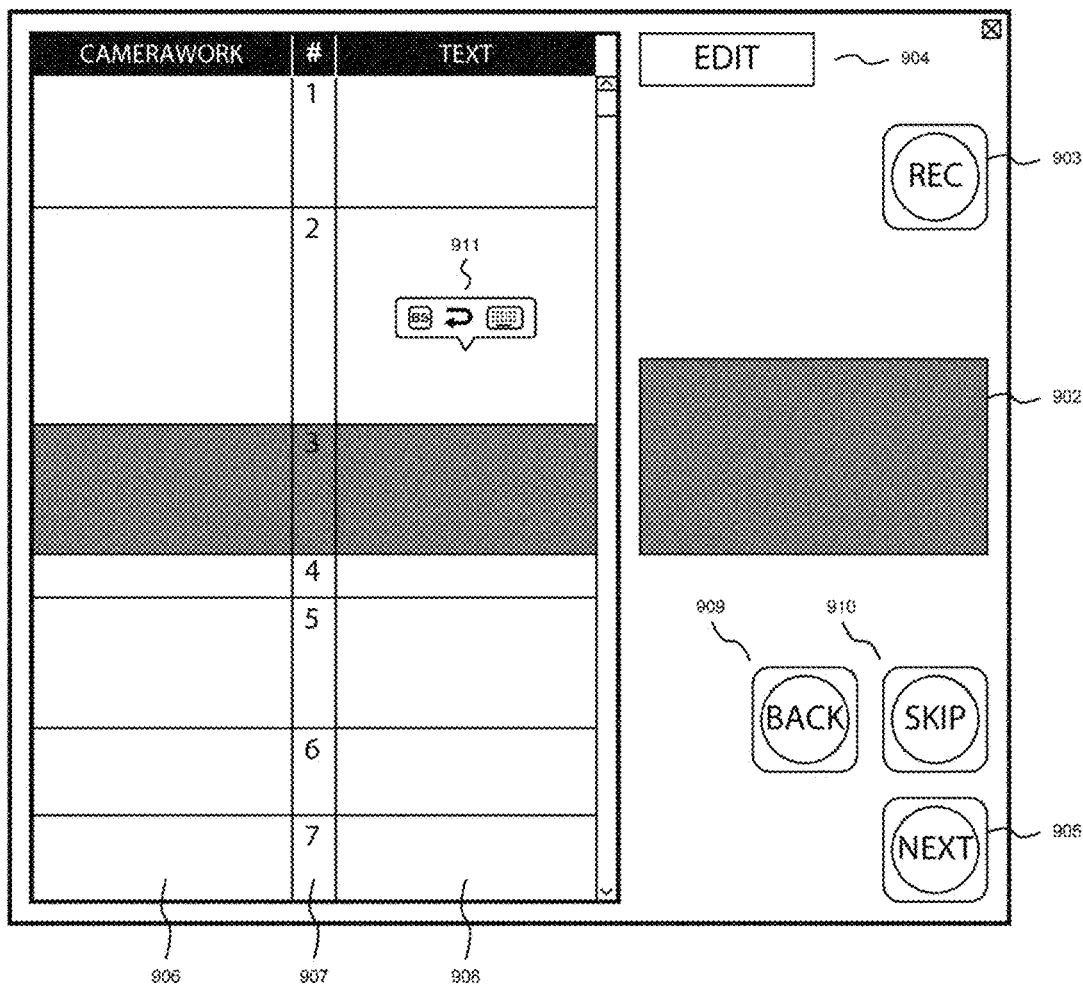

[Fig. 10]
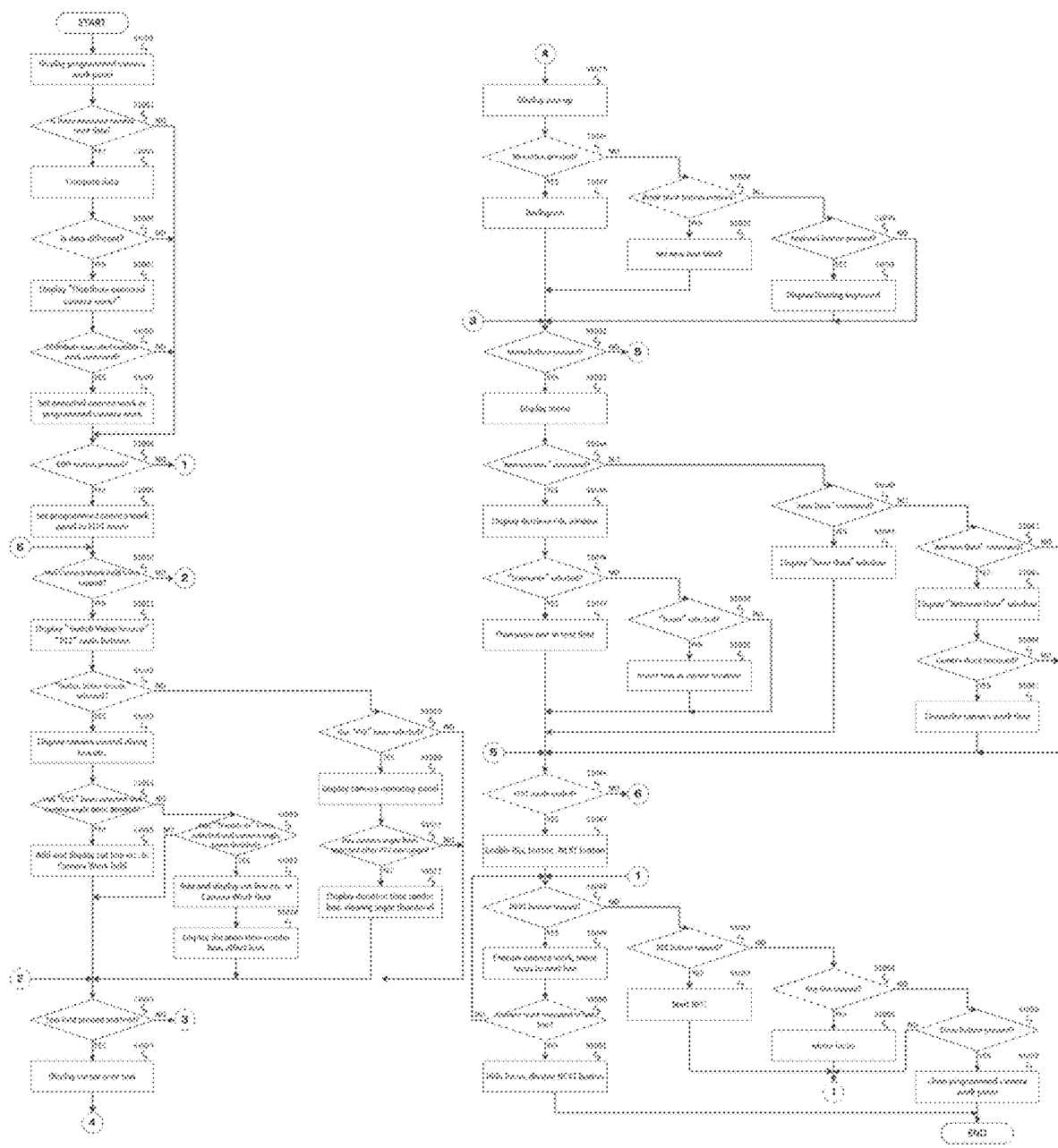

[Fig. 11]
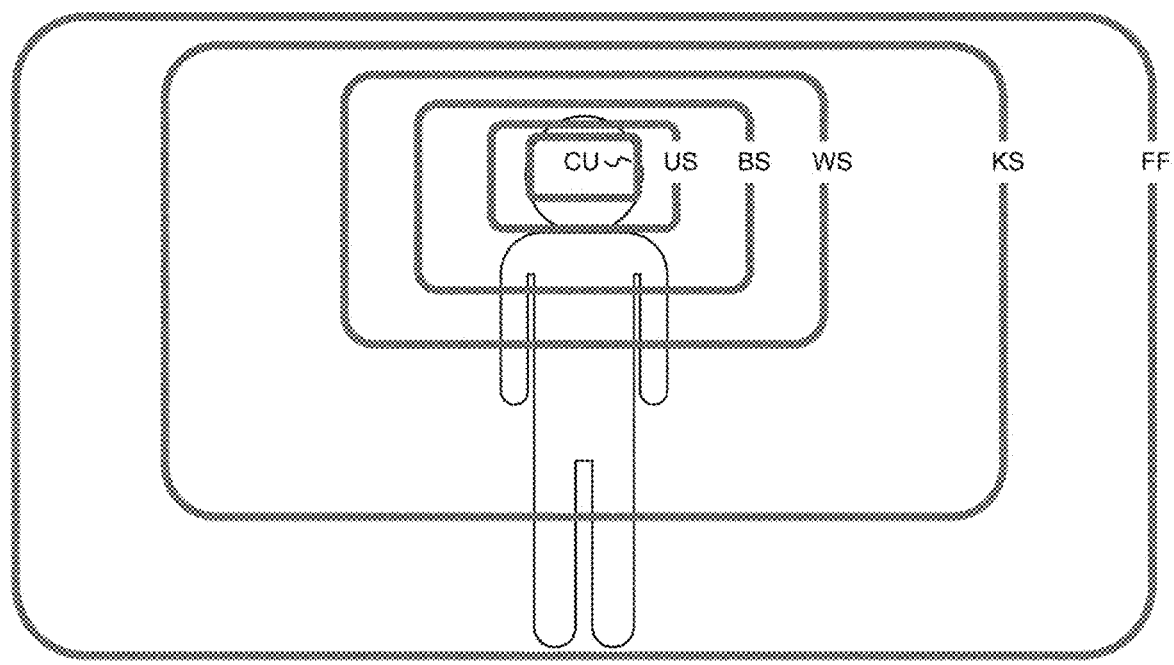

[Fig. 12]

```
<!DOCTYPE smil PUBLIC "-//W3C//DTD SMIL 2.0//EN"
"http://www.w3.org/TR/REC-smil/SMIL10.dtd">
<smil>
  <head>
    <meta name="title" content="Program Title" name="s-num" content="Scene Number" name="t-num" content="Take Number" name="rate" content="Rating" />
  </head>
  <body>
    <seq>
      <video src="D:\cam1\Clip1.mxf" clipBegin="hh:mm:ss:ff clipEnd="hh:mm:ss:ff" />
      <video src="D:\cam2\Clip2.mxf" clipBegin="hh:mm:ss:ff clipEnd="hh:mm:ss:ff" />
      <transition type="dissolve" Begin="hh:mm:ss:ff dur="hh:mm:ss:ff" />
      <video src="D:\cam1\Clip1.mxf" clipBegin="hh:mm:ss:ff clipEnd="hh:mm:ss:ff" />
      <video src="D:\cam2\Clip2.mxf" clipBegin="hh:mm:ss:ff clipEnd="hh:mm:ss:ff" />
    </seq>
  </body>
</smil>
```

[Fig. 13]
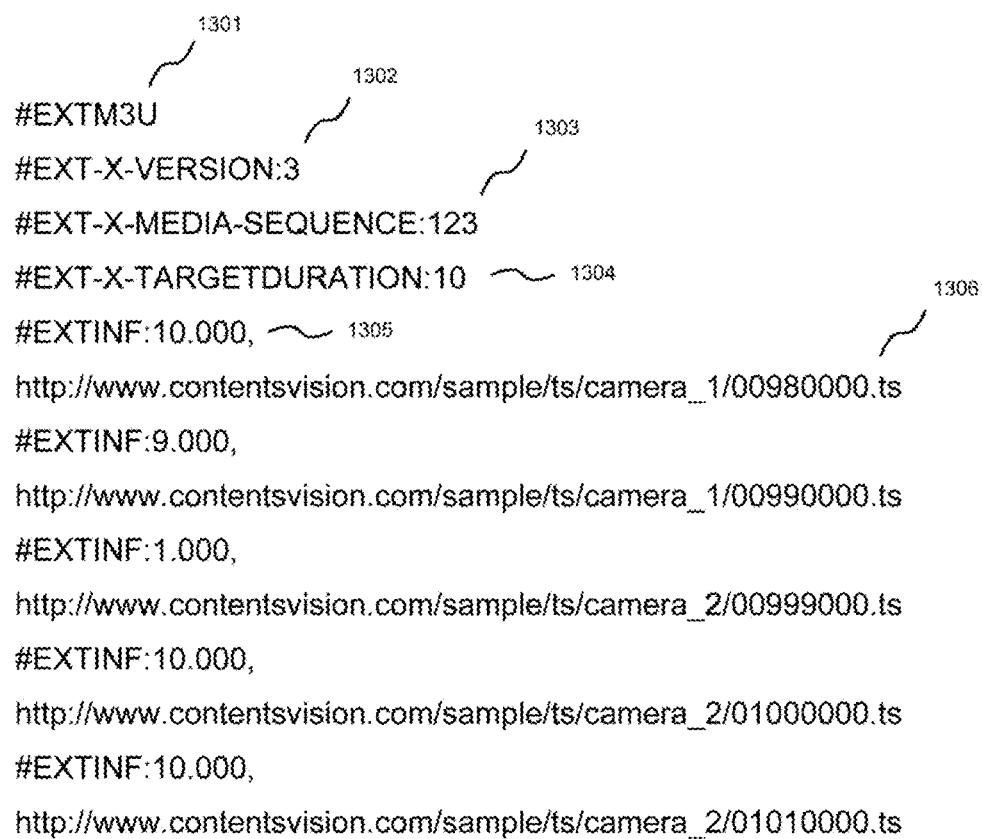

[Fig. 14]

TITLE: SAMPLE SEQENCE ~ 1401
FCM: DROP FRAME ~ 1402

FCM: DROP FRAME ~ 1403
001  001  AA/V  C    00:00:20:00 00:00:30:00 00:00:00:00 00:00:10:00
002  002  AA/V  C    00:00:30:00 00:00:50:00 00:00:10:00 00:00:30:00
003  001  AA/V  C    00:00:50:00 00:01:10:00 00:00:30:00 00:00:50:00
004  003  AA/V  C    00:01:10:00 00:01:50:00 00:00:50:00 00:01:30:00
005  002  AA/V  C    00:01:50:00 00:02:00:00 00:01:30:00 00:01:40:00
 ╲    ╲    ╲    ╲         ╲           ╲           ╲           ╲
1404 1405 1406 1407      1408        1409        1410        1411

[Fig. 15]
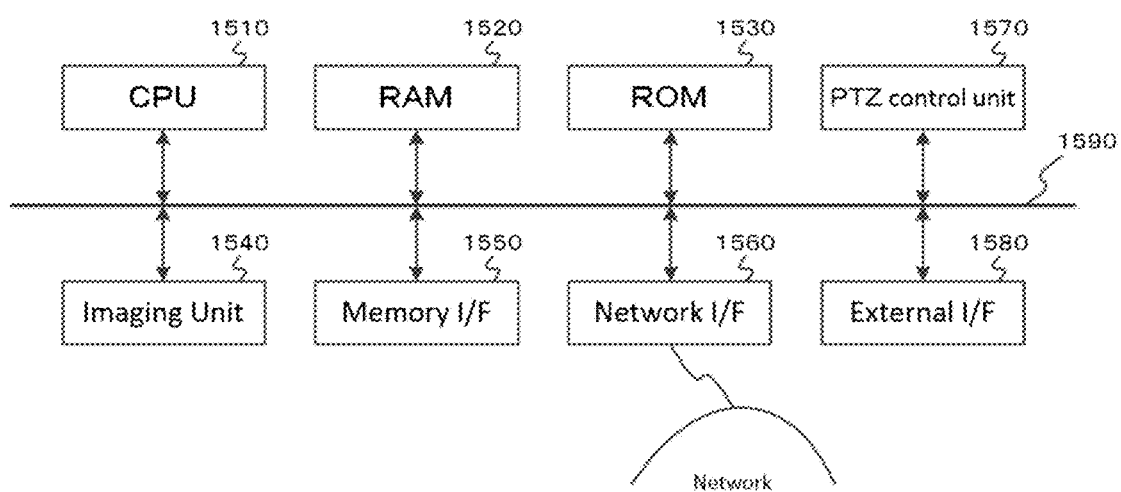

[Fig. 16]
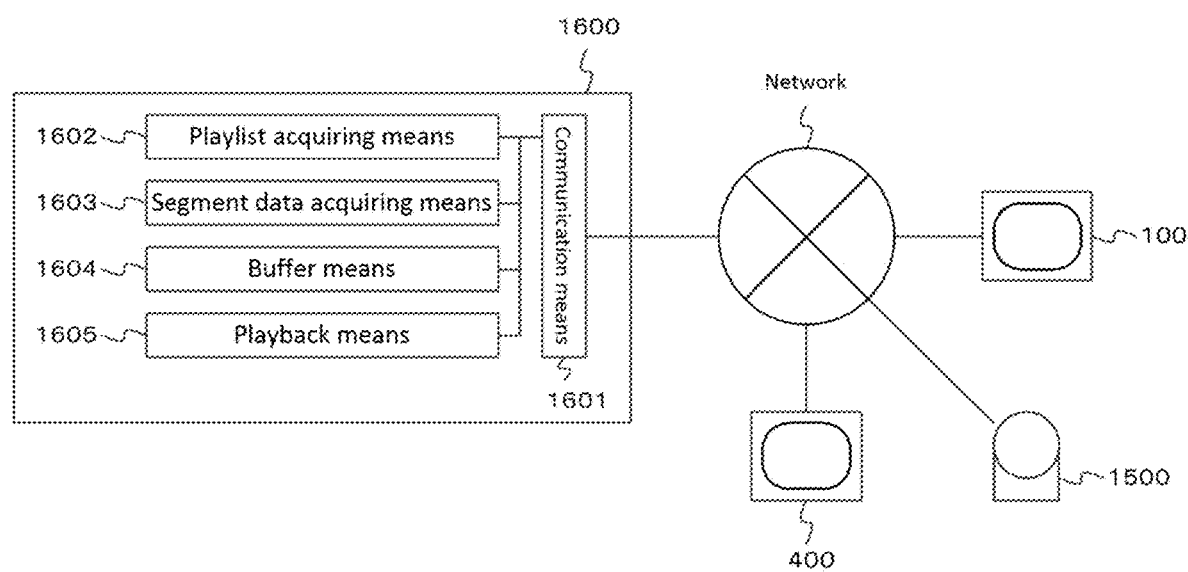

INFORMATION PROCESSING DEVICES, METHODS, AND COMPUTER-READABLE MEDIUM FOR PERFORMING INFORMATION PROCESSING TO OUTPUT VIDEO CONTENT USING VIDEO FROM MULTIPLE VIDEO SOURCES INCLUDING ONE OR MORE PAN-TILT-ZOOM (PTZ)-ENABLED NETWORK CAMERAS

This application is a National Stage application of International Application No. PCT/JP2021/028523, filed Aug. 2, 2021, which claims priority to Japanese Application Nos. 2020-135599 (filed Aug. 11, 2020) and 2020-164204 (filed Sep. 30, 2020), the entire disclosures of which are incorporated herein by reference.

TECHNICAL FIELD

The present invention relates to an information processing device that processes information related to the production and distribution of video content using video from multiple video sources that include network cameras.

BACKGROUND ART

Video content such as that for television programs is usually created by capturing video signals sent by multiple imaging devices from different directions (angles of view) with respect to the object to be captured, displaying the video signals on monitor screens, and switching between video to be used and video not to be used in video content provided to viewers by operating a switching button on a switcher (video switching means).

Network cameras that transmit video signals via computer networks such as the internet and LANs have become increasingly popular. In recent years, video cameras and digital cameras for business, broadcasting, and general use have been introduced that can send video being captured over a computer network.

Use of network cameras (cameras that can send video over a computer network) to create video content by switching between video sources would reduce labor and equipment costs, such as line setting and reduce production costs by simplifying and speeding up the production of video content.

Also, in recent years, HTTP streaming distribution, which transmits video in compliance with the Hyper Text Transfer Protocol (HTTP), has become mainstream in the distribution of video over the internet. In HTTP streaming, video data is segmented (subdivided) into TS (transport stream) files of short duration (for example, 10 seconds), HTTP data transfers are performed together with a playlist (in the M3U file format or MPD file format) that provides playback instructions, and TS files are received by a viewer terminal and played back consecutively according to the playlist. HTTP streaming uses formats such as HLS (HTTP Live Streaming) and MPEG-DASH (Dynamic Adaptive Streaming over HTTP).

Methods used to transmit data over computer networks include TCP (Transmission Control Protocol), which keeps retransmitting the same data (packets) until reception by the receiving node is confirmed, and UDP (User Datagram Protocol), which transfers data without confirming reception by the receiving node with the sending node. By using TCP (Transmission Control Protocol) in HTTP streaming data transfers, deterioration in signal quality during data transfers can be suppressed. Also, because this transfer method is similar to a general file transfer method used by web servers, distribution costs can be reduced.

Patent Document 1 discloses a technique for a system that enables the selection of the desired video from video received from multiple camera devices and that simplifies the system configuration by providing a system comprising a plurality of camera devices that packetize and output captured video signals, and a relay device that is connected to the plurality of camera devices to relay the video signals transmitted from the plurality of camera devices, wherein the relay device includes a receiving unit that receives video signals synchronized between the plurality of camera devices based on synchronization signals, and a switching unit that selects and outputs video signals from the plurality of camera devices based on control signals for selecting video.

Patent Document 2 discloses a video transmitting device and monitoring system applicable to IP-based broadcasting systems by providing a video transmitting device that receives uncompressed video signals and then generates IP packet streams of uncompressed video data while also compressing the uncompressed signals to generate an IP packet stream of compressed video data, a video distribution system that distributes an IP packet stream of uncompressed video data as a high-quality video from among the IP packet streams received from the plurality of video transmitting devices while also distributing an IP packet stream of compressed video data to a monitoring system for video monitoring, and a monitoring system that selects the IP packet stream to be displayed on a monitor from the IP packet streams of the compressed video data and then displays the stream on the monitor.

Patent Document 3 discloses a technique for an information processing device that makes it possible to decide which video composition to use and how to switch between video sources that include multiple cameras by allocating a video source such as an imaging device or camera work to the input of text, and looking at the text (characters/character strings) showing the content composition such as a composition script or coverage memo.

Patent Document 4 discloses a technique for a video streaming distribution device that can release clip information files including playlists that define clips of highlights on the web while distributing live video, such as a live sports broadcast, by generating a clip information file that identifies video clips for playback extracted from streaming data and a playback instruction file with instructions for playback of the segment files that constitute the clip, editing the clip information file including the playback instruction file and transferring the clip information file to a public site.

Patent Document 5 discloses a content distribution technique that uses IP multicast communication to distribute video in accordance with the HTTP protocol while minimizing playback loss by providing a playback means for playing back video files containing multiple TS packets, a UDP packet receiving means for breaking down a video file containing multiple TS packets to receive UDP packets transmitted by IP multicast, and a video file reconstituting means for reconstituting the UDP packets received by the UDP packet receiving means as a video file and supplying the video to a playback means in accordance with the HTTP protocol, wherein the video file reconstituting means reconstitutes video files so as to contain only complete TS packets when at least one of the UDP packets in a video file is not received.

CITATION LIST

Patent Literature

[Patent Document 1] JP 2015-062311 A
[Patent Document 2] JP 2016-009881 A
[Patent Document 3] JP 2012-014420 A
[Patent Document 4] JP 5909546 B2
[Patent Document 5] JP 6490284 B2

SUMMARY OF INVENTION

Technical Problem

In order to transfer video signals from a network camera in real time, RTP (Real-time Transport Protocol) based on UDP (User Datagram Protocol) is used, which essentially transfers data without confirming reception by the receiving node with the transmitting node. However, because RTP communication does not retransmit data when transmitted data does not reach the receiving party, video and audio deteriorate due to the packet loss that occurs when transferred data is lost over the network. As a result, the data cannot be used in video content to be viewed by viewers. Meanwhile, because TCP/IP (Transmission Control Protocol/Internet Protocol), which is used as the standard in computer networks, prioritizes data quality over real-time performance (timing shifts), video data transferred by TCP/IP is not suitable for live video involving switching and camera work controls. High-quality video and audio distribution without noise is possible using HTTP streaming. However, because switching is not reflected in the data generated and outputted from each network camera or video source, data processing is required to perform HTTP streaming distribution that reflects switching.

There is no prior art technique, including the ones disclosed in the document mentioned above, that has solved these problems. Therefore, it is an object of the present invention to solve these problems by providing an information processing device suitable for switching video from multiple video sources, including network cameras, and outputting (producing and distributing) video content.

Solution to Problem

The present invention is an information processing device that performs information processing to output (produce and distribute) video content using video from multiple video sources including network cameras, the information processing device comprising: a switching means for performing switching based on video signals transferred by the transfer method used to transfer data without confirming reception by the receiving node with the transmitting node at the video source; and an information processing means that outputs (produces and distributes) video content based on information indicating which video source was switched at what time by the switching means and based on video data outputted from the video sources.

Effect of the Invention

The present invention is able to realize an information processing device suitable for outputting (producing and distributing) video content by switching video sources that include network cameras.

BRIEF DESCRIPTION OF DRAWINGS

FIG. 1 is a block diagram showing the main configuration of the information processing device in an embodiment of the present invention.
FIG. 2 is a diagram showing the information processing device in the embodiment being used.
FIG. 3 is a block diagram showing the functional module configuration of the information processing device in the embodiment.
FIG. 4 is a block diagram showing the functional module configuration of a switcher terminal.
FIG. 5 is a diagram showing an example of a web application screen displayed by the information processing device in the embodiment on the touch panel display of the switcher terminal.
FIG. 6 is a diagram showing an example of a camera operating panel displayed by the information processing device of the embodiment on the touch panel display of the switcher terminal.
FIG. 7 is a flowchart showing operations performed by the information processing device in the embodiment to generate and output sequence data.
FIG. 8 is a flowchart showing operations performed by the information processing device in the embodiment to generate and distribute a playlist based on information indicating which video source was switched at what time.
FIG. 9 is a diagram showing an example of the programmed camera work panel that is displayed after pressing the programmed camera work button 523.
FIG. 10 is a flowchart showing operations performed by the programmed camera work function.
FIG. 11 is a diagram used to explain the "size" of a shot.
FIG. 12 is a diagram showing an example of sequence data outputted by the information processing device in the embodiment.
FIG. 13 is a diagram showing an example of a playlist.
FIG. 14 is a diagram showing an example of EDL data.
FIG. 15 is a block diagram showing the main configuration of a network camera that can be connected to the information processing device in the embodiment.
FIG. 16 is a block diagram showing the configuration of the function module for receiving and playing back content in a viewer terminal that can be connected to the information processing device of the embodiment.

DESCRIPTION OF EMBODIMENTS

In the present specification, "switching" refers to switching (video signals from) a video source, and includes both "cut switching" which is instantaneous switching and "transitioning" which is switching that occurs over a certain period of time.

Also, "panning" that moves the viewing angle of a camera in the horizontal direction, "tilting" that moves the viewing of a camera vertically, and "zooming" that enlarges or reduces the viewing angle of a camera are referred to collectively as "PTZ". Switching (cut switching and transitioning) and PTZ control (pan/tilt/zoom control) are collectively referred to as "camera work".

A unit of video captured continuously with a single camera from the beginning to the end without a start and stop in the middle is referred to as a "shot". Also, continuous video composed of shots and the switching and combining of video in units equivalent to a shot is referred to as a "scene". A single recording performed of a scene with the same composition is referred to as a "take".

A video production provided to viewers is referred to as a "program", "program content", or "video content". The numbers indicating the order in which scenes appear in "video content" are referred to as "scene numbers". Video from a video source that is being switched from is referred to as "PGM". Video from a video source that is being switched to (prior to switching) is referred to as "PST".

A preferred example of the present invention will now be described with reference to the appended drawings.

FIG. 1 is a block diagram showing the main configuration of the information processing device 100 in an embodiment of the present invention. In this information processing device 100, a CPU 110, a RAM 120, a ROM 130, a display 160, an operating unit 170, and a network interface 190 are connected to each other via an internal bus 180.

The CPU 110 controls the operations of the information processing device 100 itself (the operation of each component to perform its function), generates signals that control the operations of the video sources, and processes data.

The RAM 120 is a high-speed writable storage device on which the OS, programs, and data have been loaded. It is also used as a workspace for the OS and the programs.

The ROM 130 is a non-volatile read-only storage device that is used as a permanent storage area for the BIOS, basic programs, and basic data.

The display 160 is a display device such as an LCD (liquid crystal display) panel.

The operating unit 170 can be a keyboard, a mouse, a joystick, a remote controller, or a touch panel (including a touch display).

The user can operate the device to execute various functions using the touch display by, for example, touching a GUI (graphical user interface) item such as an icon with a finger or stylus pen, or by making a gesture such as tapping (quickly touching) or flicking (quickly touching and removing) with a finger or stylus pen.

The network interface 190 is an interface used to connect to a network in order to connect with video sources such as network cameras 1500, viewer terminals 1600, and switcher terminals 400 via the network. Examples of networks include the internet, wired LANs, wireless LANs, and mobile phone networks.

FIG. 2 is a diagram showing the overall configuration of a content outputting system including the information processing device in the present embodiment. In FIG. 2, 100 is an information processing device that outputs (produces and distributes) content, and provides content production functions such as distributing video content to viewer terminals 1600 via a network, and performing switching using switcher terminals 400. The viewer terminals 1600 and switcher terminals 400 can be information terminals such as personal computers ("PCs"), tablets, and smartphones.

In the depicted example, an "event" 210, such as a ceremony, sporting event, game, music performance, scientific experiment, news report, social information session, meeting, or drama, is shot from different directions (angles) by multiple cameras 1500-1, 1500-2, etc.

The switcher terminal 400 has, for example, a touch panel display with an integrated touch panel that accepts GUI operations performed by the user (content creator). The operating screen (GUI) displayed on the touch panel display is displayed as a web application on a web browser launched on the switcher terminal 400 by the web server function of the information processing device 100. A video source such as a network camera 1500 is connected to the switcher terminal 400 via a network to enable the terminal to perform device controls such as data access and panning/tilting by authenticating the device using an IP address, username, and password. The content creator switches video sources based on video signals (real-time live views) UDP-transferred from the video sources to the switcher terminal 400 while proceeding with the event by cueing, etc. At this time, sequence data recording which video source was switched and at what time is generated, and this sequence data is transferred to and stored in the RAM 120 of the information processing device 100.

Meanwhile, video data (video clips) from video sources such as cameras 1500-1, 1500-2, etc. is first stored (cached or buffered) in a storage means (storage medium such as RAM or SD card) in the video source. When the video source is switched, subdivision processing is performed to convert the stored video data (video clips) into segment data (TS files), which is transferred and saved to a specific storage area (for example, an online storage folder). If necessary, a functional module for subdividing, transferring, and storing data is introduced to the storage means (or the control means that controls the storage means). Alternatively, if the video sources have an HTTP streaming function, segment data (TS files) are generated and held in each video source. Then, time information such as the time code attached to the segment data (TS files) as metadata is referenced and compared with the time at which the video source was switched, and segment data (TS files) related to the switched time is transferred to and saved in a specific storage area (for example, an online storage folder).

Next, the information processing device 100 in the present embodiment generates a playlist (an index file such as M3U file or MPD file) including the file path and time length of the segment data related to the time when the video source was switched in the manner described above, and distributes the playlist to a viewer terminal 1600 (and registers the playlist in the distribution directory). The viewer terminal 1600 refers to the playlist (M3U file or MPD file, etc.) and requests segment data to perform streaming distribution of the video content in which there is switching between multiple video sources.

Segment data generated from the video from each video source may be recorded and saved in the video source itself or a recording device (recording medium) connected to the video source without passing through a computer network, and the data may be distributed to (or acquired) by the viewer terminal 1600 from there. In this way, the latency before the segment data can be acquired by the viewer terminal 1600 is improved (the delay is reduced).

As mentioned earlier, because real-time performance is prioritized over data quality in UDP transfers (noise occurs), the video signals transferred via UDP should not be distributed to viewers or used to create video content. Therefore, the switcher terminal 400 performs switching while checking the progress of the event in real time using video signals (live views) transferred by UDP from each video source. Information related to which video data (video source) was switched at what time is generated and outputted as "sequence data". This sequence data includes an ID (identifier) of the video data (video clip) transmitted from the video source, which is associated with the video data. It also includes information on which video data (video source) was switched at what time using the time code of the in-point (start of switching and insertion) and the out-point (end of insertion). In other words, the video data corresponding to a shot in a scene in the video content can be referenced. By editing video data without any deterioration in quality based on sequence data on a video editing terminal 240 connected to the recording medium 230, the user (content creator) can add music effects, subtitles, or video effects when appropriate to complete the video content to be viewed by viewers.

The information processing device 100 in the present embodiment also generates a playlist indicating the file path to the segment data of the video at the time that the video source was switched. Because TCP is used to transfer and distribute segment data, data quality is ensured, and high-quality video and audio distribution without noise can be delivered to a viewer terminal 1600. In other words, the information processing device 100 in the present embodiment switches the video source based on live view video transferred by UDP from a plurality of video sources including network cameras. A playlist for content distribution is generated based on information related to which video source was switched at what time, and the video data from the switched video source is acquired by the viewer terminal 1600 via TCP transfer based on the generated playlist.

By using this configuration, the information processing device 100 in the present embodiment can be used to switch video sources in near real time over the course of "events" such as ceremonies and dramas while outputting (producing and distributing) video content made from video data that does not deteriorate in quality due to network transmission, and supplying the video content to viewers. In recent years, WebRTC (Web Real-Time Communication) has been introduced as a technology for conducting real-time video communication using UDP in a web browser, and WebRTC can be used as a method of transferring live view video from video sources for switching purposes. Also, when a web browser cannot display a UDP video stream, snapshot acquisition commands specified by ONVIF can be sent to network cameras to continuously acquire still images (JPEG images) and perform switching based on these still images. Still images (JPEG images) cannot be used for viewers because the frame rate (number of display frames per unit time) is not sufficient even when continuous. However, video content without noise or frame rate reductions can be outputted (produced or distributed) for viewing based on information about which video source was switched at what time and video data outputted from the video sources when switching is performed using this information. In other words, even when a web browser does not support a UDP video stream, an information processing means can be realized that displays a switching means on a web browser, switches the video source for the user, and outputs (produces or distributes) the video content.

FIG. 3 is a block diagram showing the functional module configuration of the information processing device 100 in the present embodiment. The information processing device 100 includes a storage unit 301, a communication unit 302, a segment data generating unit 303, a playlist generating unit 304, a playlist distributing unit 305, a segment data distributing unit 306, a switcher unit 307, and a system clock 308. The functions shown in FIG. 3 are realized by performing information processing using software stored in the device and hardware resources in various places. For example, in the switcher means 307, the CPU 110 processes information using software stored in the ROM 130 of the information processing device 100, and a touch GUI is displayed on a web application running on the touch panel display of the switcher terminal 400.

The storage means 301 holds video content in a format such as a combination of video clip files outputted from video sources and sequence data recording the switching times of the video clip files, or segment data obtained by subdividing video clip files. The ID (identifiers) and passwords etc. of the user of the switcher terminal (user of the web application), content viewers, and advertisers are also held, respectively, in a creator database, a viewer database, and an advertiser database.

The communication means 302 exchanges data and commands with the switcher terminal 400 and viewer terminals 1600, etc. For example, it communicates with the web browser on the switcher terminal 400 to display the web application. Content is also streamed upon request from a web browser on a viewer terminal 1600.

The segment data generating means 303 generates segment data (TS files) obtained by subdividing video data outputted from video sources into small time intervals (for example, 10 seconds) in accordance with a standard format such as "MPEG-2 TS". At this time, the ID of the video source, time data on when the video data was shot, and the file path to the generated segments, etc. are stored in the storage means 301 as segment data information.

The playlist generating means 304 generates a playlist in which the file path and the time length of segment data related to the switching time of the switched video source from the segment data generated by the segment data generating means 303.

The playlist distributing means 305 distributes the playlist to a viewer terminal 1600 in response to a request from the viewer terminal 1600. Playlists are registered and saved in the distribution directory (folder).

The segment data distributing means 306 distributes segment data (TS files) to a viewer terminal 1600. Specifically, segment data (TS files) is registered and saved in a specific directory (folder), and the file path is included in a playlist.

The switcher means 307 selectively switches video sources connected to the switcher terminal 400 as a constituent elements as video content of an event is being created according to instructions from the content creator user as the event progresses. The system clock 308 keeps synchronized time with a time server.

FIG. 15 is a block diagram showing the main configuration of a network camera 1500 that can be connected to the information processing device 100 in the present embodiment. In the network camera 1500, a CPU 1510, RAM 1520, ROM 1530, imaging unit 1540, memory interface 1550, network interface 1560, PTZ control unit 1570, and external interface 1580 are connected to each other via an internal bus 1590.

The CPU 1510 controls the operations performed by the network camera 1500. The RAM 1520 is a high-speed writable storage device in which the OS, programs, and data has been loaded. It is also used as a workspace for the OS and the programs. The ROM 1530 is a non-volatile read-only storage device that is used as a permanent storage area for the BIOS, basic programs, and basic data. Identification ID (such as an IP address) for identifying the network camera 1500 is held in the RAM 1520 or the ROM 1530. The imaging unit 1540 photoelectrically converts optical images using an imaging sensor such as a CCD or CMOS and transfers the converted signals to the CPU. The memory interface 1550 is connected to a recording medium such as an SD card or HDD to read and write video signals and data. The network interface 1560 is responsible for the interface used to communicate with the information processing device 100 and various clients according to the internet protocol or some other protocol such as ONVIF via the network. ONVIF is a protocol established by the Open Network Video Interface Forum standardization organization that is used to implement commands for device control and start the distribution of video and metadata. The PTZ control unit 1570 obtains the panning/tilting/zooming state of a PTZ camera having a panning/tilting/zooming mechanism, and performs PTZ controls based on operating instructions. Accessories such as a microphone and viewfinder are connected to the external interface 1580. These do not have to be attached directly to the camera, and may be connected to a terminal via a cable, or may be connected wirelessly. When audio is picked up by the microphone, it is recorded on an audio track integrated with the video signals.

FIG. 16 is a block diagram showing the configuration of the function module for receiving and playing back content in a viewer terminal 1600 that can be connected to the information processing device 100 of the present embodiment. The viewer terminal 1600 includes a communication means 1601, a playlist acquiring means 1602, a segment data acquiring means 1603, a buffering means 1604, and a playback means 1605.

The communication means 1601 communicates with the information processing device 100 via a protocol such as HTTP. The playlist acquiring means 1602 makes a playlist acquisition request to the information processing device 100, and acquires a playlist from the information processing device 100. Before playback of the segment data listed in the acquired playlist is completed, the playlist acquisition request is retransmitted and a playlist acquired (loaded) again. When the acquired playlist indicates that it is the last playlist, acquisition of the playlists ends. The segment data acquiring means 1603 acquires segment data in the order described in the acquired playlist. In other words, an acquisition request is sent to the URL (Uniform Resource Locator) indicating the file path of a TS file listed in the playlist. The buffering means 1604 buffers (temporarily holds) the acquired segment data for a certain period of time. The playback means 1605 retrieves and plays the segment data buffered by the buffering means 1604 in the order listed in the playlist.

FIG. 4 is a block diagram showing the functional module configuration of a switcher terminal 400. In FIG. 4, 401 is a video source thumbnail displaying means that generates thumbnail video from video signals (live views) of video sources connected to the information processing device 100 and displays the thumbnails on the touch panel display of the switcher terminal 400.

A main menu displaying means 402 displays the main menu on the switcher terminal 400. A volume level displaying means 403 displays the volume level of the audio signals from the video source selected (switched to) by the user (the "PGM") among the video sources connected to the information processing device 100 on the touch panel display of the switcher terminal 400. An "ON AIR" indicator displaying means 404 indicates on the touch panel display of the switcher terminal 400 that a start instruction has been received from the user and sequence data consisting of information such as the switched video source and the switching time is being outputted. The output start and end controlling means 405 controls the start and end of sequence data etc. output.

A video monitoring means 406 displays video signals of the video source (PGM) selected (switched to) by the user in the monitoring section 506 on the switcher terminal 400 touch panel display. A video source searching, addition and deleting means 407 searches for, adds, and deletes video sources that can be connected to the information processing device 100. A switching means 408 selects (switched to) a video source connected to the information processing device 100 is selected (switched) as the PGM based on a user instruction, and displays the video signals in the monitoring section 506 on the switcher terminal 400 touch panel display. A camera control means 409 generates a camera control command based on a user operation and sends the command to the target camera. A transition means 410 controls switching from the video source selected as the PGM to another video source over a certain period of time. A property means 411 reads and writes properties to the sequence (timeline) of video sources. A device setting means 412 is used to set and adjust the display text size and screen brightness of the switcher terminal 400 touch panel display, the volume, and the WiFi connection, etc.

A system clock 413 keeps synchronized time with a time server. A data outputting means 414 outputs the generated sequence data in a data formats such as SMIL (Synchronized Multimedia Integration Language), CSV (Comma Separated Value), EDL (Edit Decision List), or AAF (Advanced Authoring Format). A programmed camera work means 415 is used to program a series of camera work (switching and PTZ control) for each scene. A camera work executing means 416 successively executes camera work programmed by the programmed camera work means 415 based on user instructions.

Some network cameras have panning/tilting/zooming capability. The information processing device 100 in the present embodiment has a PTZ control means for controlling the panning, tilting, and zooming of these network cameras. Using this configuration, the panning, tilting, and zooming of the network cameras can be controlled in near real time as an "event" such as a ceremony or drama progresses to create video content based on video data with little deterioration in quality due to network transmission, and provide this video content to viewers. In the present embodiment, the switching means and the PTZ control means are integrated. Using this configuration, the creation of video content can be "directed" by linking switching and PTZ control as an "event" such as a ceremony or drama progresses. For example, video content produced during a wedding ceremony can be "directed" for example by zooming in on the bride as she reads out loud the "letter of thanks to her parents" and then switching to a camera that captures her parents the moment the letter is read.

FIG. 5 is a diagram showing an example of a web application screen displayed by the information processing device 100 in the present embodiment on the touch panel display of the switcher terminal 400. Here, 501 is the GUI of the switcher application, 502 is a menu button used to call up the main menu, and 503 is an audio meter indicating the volume level. Also, 504 is an "ON AIR" indicator that indicates whether recording (sequence data recording) or broadcasting (streaming) is occurring, and 505 is a start button used to start "ON AIR" recording or broadcasting. When the start button 505 is pressed to start recording or broadcasting, the start button 505 is replaced with a stop button 505-2. The monitoring section 506 is an area for displaying the video of the selected (switched to) video source (PGM).

The video source section 507 is an area for displaying thumbnails from video sources that can be switched to. The video source thumbnails 5071, 5072, etc. are displayed in the video source section 507. Video source thumbnails are thumbnail icons from a plurality of video sources connected to the information processing device 100 via a network, and display the video outputted by each video source as thumbnails. In the example shown in FIG. 2, cameras 1500-1, 1500-2, etc. are the video sources, and the video captured by these cameras is displayed in real time as video source thumbnails. When shooting is not occurring, the last frame is displayed in a static state, or a so-called "black screen" is displayed. In the example shown in FIG. 5, the video captured by the three PTZ (pan/tilt/zoom) cameras and VTR video is displayed. The video referred to here can be, for example, video data that has been shot in advance and stored in a recording medium such as the RAM 120 of the information processing device 100 or online storage. This VTR video can be used as material for video content. The plus button 508 is a button used to search for and add a video source to be displayed in the video source section 507. A camera control button 509 is used to control each video source. When the camera control button 509 is pressed by the user, a camera control panel 600 is displayed. A camera operation panel 600 is displayed for each camera. As so-called floating windows, the positions of these control panels can be moved. Switching type buttons 510 are used to change the type of switching, and consists of a cut selection button 510-1 that selects a "cut", which is an instant switch, and a transition selection button 510-2 that selects a "transition", which is a gradual switch with a visual effect. The cut selection button 510-1 and the transition selection button 510-2 are toggle buttons that are exclusively (alternatively) selected with respect to each other.

A rating button 511 is used by the user (content creator) to rate the recorded take. A timeline area 512 is used to display a so-called "filmstrip" (sequence of thumbnail shots constituting a scene). Also, 513 is a comment area in the timeline area, 514 is a timecode scale, and 515 is a video source thumbnail display area for displaying (thumbnails) of the video source that has been switched to on the timing of the time code in the timeline area. The length of each video source thumbnail along the timecode scale 514 corresponds to the time length of a "shot". The comment area 513 displays comments entered by the user. Here, 516 is the play button. When the play button 516 is pressed, the recorded video sequence (recorded in the RAM 120 by connecting live views from each video source) is played back from the time indicated by the sequence marker 517 on the time code scale 514, and displayed in the monitoring section 506. When the play button 516 is pressed, it is replaced by a stop button 516-2. If there is no playable video sequence (if a video sequence is not being recorded), the play button 516 is disabled (grayed out). A property button 518 is used to display a property panel in order to add or change the scene title, take number, etc. of the video sequence displayed on the timeline in the timeline area 512. Scenes and takes created so far can be retrieved and played back from the property panel. Here, 519 is a magnification slider that adjusts the size of the displayed timeline, 520 is a fader or a switching slider used to perform a switching operation during a transition, 521 is a scene title combo box that displays the scene title, 522 is a take number text box that displays the take number, and 523 is a programmed camera work button that displays a programmed camera work panel for performing programmed camera work functions. The programmed camera work functions will be described later.

Because the display on the switcher terminal 400 is configured as a touch panel display integrated with the touch panel, the user can execute various functions using the touch display by, for example, touching a GUI (graphical user interface) item such as an icon with a finger or stylus pen, or by making a gesture such as tapping (quickly touching) or flicking (quickly touching and removing) with a finger or stylus pen. For example, by tapping on a thumbnail 5071, 5072, etc. of a video source unit 507, the video source corresponding to the thumbnail can be selected (switched to) as the PGM. At this time, a red frame is applied to the thumbnail, indicating that the corresponding video source has been selected. Video from the video source is also displayed in the monitoring section 506. The ID of the video source (or the video clip generated by the video source) and the tapped time (time code) are recorded as sequence data. When the user taps on the start button 505, recording of sequence data and recording of a video sequence (a sequence in which live views of switched video sources are connected form a single sequence) are started. When a thumbnail of a video source unit 507 is touched by the user and dragged toward another thumbnail, the video source corresponding to the thumbnail touched second is switched to as so-called preset video ("PST"). When the thumbnail touched second is touched while touching the thumbnail touched first, a gradual change is made by the transition means 410 with an effect (transition effect) from the PGM video displayed in the monitoring section 506 (video of the thumbnail video source touched first) to video of the video source set as the PST video (video of the thumbnail video source that was touched second). In the present embodiment, a transition instruction can be issued by performing touch gestures on the touch display means. By using this configuration, the user can perform "cuts (instantaneous switching)" and "transitions" using simple and easy to understand gestures such as "one-point touches" and "two-point touches".

The user can also performing a transition by operating the fader 520. When the fader 520 is operated by the user, the PGM video displayed in the monitoring section 506 is gradually changed to video from the video source set as the PST by the transition means 410 based on how far the fader 520 is moved. Transition controls performed using a fader operation are similar to those performed using a conventional switcher device, and so the transition can be performed on the timing desired by the user. When video source switching (cuts and transitions) are executed, the ID of the video source (or video clip) and the switching start and end times (time code) are recorded as sequence data. Here, 524 is a transition effect pull-down menus that allows the user to select a transition effect. Transition effects include "dissolve," "wipe," "slide," "squeeze," "iris," and "zoom." The transition effect pull-down menu 521 is enabled when the transition selection button 510-2 is pressed (the menu is grayed out when the transition selection button 510-2 has not been pressed). Here, 525 is a duration time up/down window is used to set the duration time or transition switching time. The duration up/down 522 window is enabled when the transition selection button 510-2 is pressed (the window is grayed out when the transition selection button 510-2 has not been pressed).

FIG. 6 is a diagram showing an example of a camera operating panel displayed by the information processing device of the embodiment on the touch panel display of the switcher terminal 400. The camera operating panel 600 has an video display section 601, a "subject tracking" checkbox 602, a "tracking during PGM" radio button 603a, a "do not track during PGM" radio button 603b, a "size setting tracking" checkbox 604, a "set size" pull-down menu 605, an "adjust connection" checkbox 606, a close button 607, a subject designating frame 608, a pan/tilt controller 609, a zoom controller 610, a focus controller 611, and a setting menu button 612. The video display unit 601 is an area for displaying the video captured by the corresponding camera. The pan-tilt controller 609 is a GUI that imitates a joystick for controlling the panning and tilting of the corresponding camera. The zoom controller 610 is a slider for controlling the zoom of the corresponding camera.

The user can also perform PTZ controls on the corresponding camera by performing a pinching or spreading gesture on the video display section 601. In other words, PTZ controls of the corresponding camera can be performed using a touch operation (pinching gesture) in which two points are touched on the video display section 601 at the same time and the two touched positions are brought closer to each other so that the viewing angle corresponding to the range displayed in the entire area of the video display section 601 zooms out and pans or is tilted toward the position of the midpoint between the two touched positions (see FIG. 6(b)). Similarly, by touching two points on the video display section 601 at the same time and moving the touched positions away from each other (spread out), pan/tilt/zoom PTZ control can be performed so that the range near the midpoint between the two touched positions expands to the range displayed in the entire video display section 601 (see FIG. 6(c)). The user can use this method to integrally perform pan/tilt operations and zoom operations using touch gestures, which is convenient. When this method is used, for example, the following ONVIF command can be sent to a network camera.

Area Zoom=x1-x0, y1-y0, w1-w0, h1-h0

Here, x1 and y1 are the coordinates of the midpoint between the two touched points after a pinching gesture has been performed, x0 and y0 are the coordinates of the midpoint between the two touched points before the pinching gesture has been performed, w1 and h1 are the width and height between the touched points after the pinching gesture, and w0 and h0 are the width and height between the touched points before the pinching gesture. The width and height of the entire image display unit 601 are both set to 200.

For PTZ, a so-called EASE IN/EASE OUT operation, such as "starting slow, accelerating gradually, decelerating in the middle, and stopping", is generally considered to be suitable for smooth movement. Therefore, when PTZ controls are performed using a pinching gesture, a speed control command that causes the PTZ operation of EASE IN/EASE OUT may be automatically transmitted over the course of the PTZ operation. When pan-tilt and zoom operations are performed integrally, the subject in the view angle due to a pan-tilt operation may be cut off from the viewing angle due to a zoom operation (and not remain in the viewing angle). It is generally considered inappropriate for a subject that has entered the viewing angle due to a zoom out operation to be cut off from the viewing angle by a pan-tilt operation. This is known as "flickering". Therefore, the optical axis angle of the pan/tilt operation and the change in the focal length of the zooming operation may be calculated and controlled so that such a subject does not come and go.

When the user performs PTZ controls, it can be convenient to know how much room there is for PTZ controls with respect to the viewing angle at the time. Therefore, when the limit is reached where the zooming and pan-tilt operations will stop if performed any further, the user can be visually notified that there is little room for PTZ controls by displaying a frame on all sides of the video display section 601 that indicates where the limit is reached. For example, when the frame surrounding the video display section 601 is displayed with an unclear boundary so that the edges of the video are blurred, and the wide-angle end where further zooming out is not possible or the telephoto end where further zooming in is not possible is reached, the degree of blurring can be reduced so that the border indicating the frame is clearly displayed. Similarly, when the limit of a panning or tilting operation is approached, the boundary indicating the sides in the panning direction or the tilting direction can be clearly displayed. By displaying a frame in this way, the user can perform PTZ controls while taking the remaining room for PTZ operation into consideration. Displaying a frame is one method of intuitively notifying the user of PTZ limits, and other notification methods include, for example, displaying a message such as "The zoom out limit is approaching". The focus controller 604 is a slider for controlling the focus of the corresponding camera. Depending on the performance characteristics of the corresponding camera, it may be possible to set the camera to autofocus mode. The setting menu button 612 is a button for displaying the menu for setting the white balance, iris, frame rate, etc. of the corresponding camera. Depending on the performance characteristics of the corresponding camera, it may be possible to set the white balance, iris, etc. of the camera to automatic mode.

The "subject tracking" checkbox 602 is a checkbox for automatically tracking a specific subject in a PTZ operation. An automatic tracking function has already been implements in the field of surveillance cameras in which pan/tilt controls are performed so that a moving object detected on the screen is kept near the center of the screen. The user can set the corresponding camera to automatically track a specific subject by selecting (checking) the "subject tracking" checkbox 602. When the "subject tracking" checkbox 602 has been selected (checked), a subject designating frame 608 is superimposed on the video display section 601 so that the user can move the frame with touch operation to place the subject to be tracked inside the frame. The "track during PGM" radio button 603a and the "do not track during PGM" radio button 603b are radio buttons used to indicate whether or not automatic tracking (automatic PTZ) should be performed when the corresponding camera is switched. This is enabled when the "subject tracking" checkbox 602 has been selected (checked) (and grayed out when the "subject tracking" checkbox 602 has not been selected (checked). The main purpose of the subject tracking described above is to keep the subject on the screen, which may be awkward and unnatural in camera work. Therefore, the risk of unnatural camera work can be eliminated by not tracking what video the viewer sees in the PGM.

The "size setting tracking" checkbox 604 is a checkbox for setting the "size" to maintain while tracking a specific subject. This is enabled when the "subject tracking" checkbox 602 has been selected (checked) (and grayed out when the "subject tracking" checkbox 602 has not been selected (checked). Here, the "size" indicates how large the subject is on the screen with reference to a human subject, and options include full shot (FS), full figure (FF), knee shot (KS), waist shot (WS), bust shot (BS), up shot (US), close up (CU) (see FIG. 11). The "size setting" pull-down menu 605 is a pull-down menu for selecting and setting the "size" option. This is enabled when the "size setting tracking" checkbox 604 has been selected (checked) (and grayed out when the "size setting tracking" checkbox 604 has not been selected (checked).

The "adjust connection" checkbox 606 is a checkbox for indicating whether or not to perform automatic PTZ that has been adjusted so that switching (cutback) from video from the PGM video source is appropriate when the video of the corresponding camera is switched away (set as PGM). This is enabled when the "size setting tracking" checkbox 604 has been selected (checked) (and grayed out when the "size setting tracking" checkbox 604 has not been selected (checked). When the video is switched from PGM and the "size" of the shots before and after the switch is the same (for example, if both are "bust shots" before and after the switch), the connection (switching) will give an unnatural impression if the length from the top of the person's head to the top of the screen is different. Also, when the "size" of the shot after switching is tighter than the "size" of the shot before switching (for example, when switching from a "waist shot" to a "bust shot"), the connection (switching) will appear unnatural unless the length from the top of the person's head to the top of the screen is shortened before and after switching. When the "size" of the shot after switching is looser than the "size" of the shot before switching (for example, when switching from a "bust shot" to a "waist shot"), the connection will appear unnatural unless the length from the top of the person's head to the top of the screen is lengthened before and after switching. Therefore, when the "adjust connection" checkbox 606 has been selected, the video from the PGM video source is analyzed, the "size" and the length from the top of the person's subject to the top of the screen are verified or estimated, and tilt controls are performed on the corresponding camera so that the length from the top of the head of the person to the top of the screen is the same when the "size" of the PGM and the option selected in the "size setting" pull-down menu 605 are the same. When the option selected in the "size setting" pull-down menu 605 is tighter than the "size" of the PGM, tilt controls are performed on the corresponding camera so that the length from the top of the person's head to the top of the screen is shorter than that of the PGM. When the option selected in the "size setting" pull-down menu 605 is looser than the "size" of the PGM, tilt controls are performed on the corresponding camera so that the length from the top of the person's head to the top of the screen is greater than that of the PGM. This can eliminate the possibility that the connection between shots before and after the switch will appear unnatural when switching to video from the PGM.

The close button 607 is a button used to close (hide) the camera operating panel 600. The subject designating frame 608 is a graphic (GUI) allowing the user to place a subject inside the frame as the subject to be tracked. A camera operating panel 600 can be displayed for each camera. As a so-called floating window, the position of the panel can be moved. As mentioned above, the information processing device 100 in the present embodiment can send PTZ instructions to a PTZ-enabled network camera using touch gestures on the touch display means. The user can use this configuration to perform pan/tilt operations and zoom operations integrally. This is very convenient because it enables the user to intuitively understand how the viewing angle is being changed by the PTZ controls. The information processing device 100 in the present embodiment also detects moving objects in video based on video signals transferred using a method that transfers data without confirming reception by the receiving node with the transmitting node at the PTZ-enabled network camera, and performs PTZ controls on the network camera so that the detected moving object kept near the center of the screen. This is because PTZ controls have to be performed based on live view video in near real time. However, as already mentioned, UDP-transferred live view video is not suitable for video content to be viewed by viewers. Therefore, by performing information processing using, for example, TCP/IP transfers and HTTP streaming of video data different from the live video, high-quality video content can be outputted (produced and distributed).

FIG. 11 is a diagram used to explain the "size" of a shot. Full shot (FS) is the widest viewing angle of the camera. Full figure (FF) is the size that extends from the toes to the top of the head. Knee shot (KS) is the size that extends from the knees to the top of the head. Waist shot (WS) is the size that extends from the waist to the top of the head. Bust shot (BS) is the size extending from the chest to the top of the head. Upshot (US) is the size that fills the screen with the face. Close-up (CU) is the size that fills the screen with certain body parts such as the eyes, mouth, hands, and feet.

FIG. 7 is a flowchart showing operations performed by the information processing device 100 in the embodiment to displays video source thumbnails corresponding to the video sources to change the video displayed in the monitoring section 506 in response to switching operations (including fader operations) performed by the user, and generate and record sequence data during a REC operation. The processing of this flowchart is realized by the CPU 110 in the information processing device 100 controlling each component based on inputted signals and a program. The CPU 110 displays the GUI 501 shown in FIG. 5 on the touch panel display of the switcher terminal 400 (step S701). Here, the information processing device 100 is receiving GUI operations performed by the user. When the user presses the plus button 508 (YES in S702), the CPU 110 searches for network-connectable video sources and displays them in a list (S703). When one or more video sources have been selected by the user and the list has been closed (YES in S704), video source thumbnails of the selected video sources are displayed in the video source section 507 (S705). When the user operates a PTZ camera by pressing the camera control button (YES in S706), the CPU 110 displays the camera operating panel 600 (S707). As described above, the camera operating panel 600 has a video display section 601, a pan/tilt controller 602, a zoom controller 603, a focus controller 604, a setting menu button 605, and a close button 606. When specifications such as the lens focal length at the wide-angle end and the telephoto end and the pan-tilt range, etc. are added for PTZ cameras serving as video sources, these are acquired using, for example, the ONVIF protocol described above. ONVIF commands etc. are also generated based on operations performed by the user on the camera operating panel 600 to control a PTZ camera (S708). When the user presses the close button 606 (YES in S709), the camera operating panel 600 is closed (S710).

When the user presses the start button 505 (YES in S711), the CPU 110 sends a command to start recording to an online storage medium or other recording medium to the video source connected to the information processing device 100 via the network (the video source displayed as a thumbnail in the video source section 507) (S712). When the scene title combo box 515 is blank (YES in S713), the scene title input panel is displayed to prompt the user to enter a scene title (S714). Here, the scene title is a combination of the title (program title) of the video content as a "finished product" and the scene number, for example, "Watanabe Family Wedding Scene 1". The take number in the take number text box 516 can be the most recent take number with a scene title plus one (S715). At this time, the start button 505 is replaced with a stop button 505-2 (S716). The generation and recording of sequence data is started that consists of the video source (or video clip) ID being switched to and the time (time code) at which the switching occurred (S717). A URL (Uniform Resource Locator) can be used as the ID of the video source or video clip. A so-called film strip appears in the timeline area 512 in which the names or thumbnails of switched video sources are arranged in accordance with the time code (S718).

When one of the video source thumbnails is tapped on by the user (YES in S719), the CPU 110 displays video from the video source corresponding to the video source thumbnail in the monitoring section 506 (S720). A red frame is applied to the thumbnail (S721) to indicate that the corresponding video source has been selected (a so-called "tally display"). The time (or a time code) is also acquired from the system clock 413 (S722). If one of the thumbnails in the video source section 507 is touched and dragged to another thumbnail by the user (YES in S723), the user switches to the video source corresponding to the thumbnail first touched (S724). This sets the video source corresponding to the thumbnail touched second as PST (preset video) (S725). The thumbnail set as the PST may be displayed, for example, with a blinking red frame. When the two touched thumbnails are touched at almost the same time and the fader 520 is operated by the user (YES in S726), the PGM video displayed in the monitoring section 506 is gradually switched to the PST video based on how far the fader 520 has been moved (S727). For the effect (transition effect) used during the switching operation, the effect selected by the user pressing the change effect button 510 is used. Note that "dissolve" may be set as the initial value for the transition effect. This is because it is a commonly used transition effect.

When the fader 520 is not operated by the user (NO in S726) and the thumbnail touched second is touched and dragged from the thumbnail touched first (YES in S728), the PGM video is gradually switched to the PST video over the user-specified duration time (S729). Then, the switching of the video source is then recorded in the sequence data (S730). The duration time is indicated by selecting a value in the "duration time of auto transition" combo box in the switching effect selection panel that is displayed when the change effect button 510 is pressed.

When the user presses the stop button 505-2 (YES in S731), a command is issued to the video source connected to the information processing device 100 via the network (that is, the video source displayed as a thumbnail on the video source section 507) to stop recording to the recording medium (S732). The stop button 505-2 is then replaced with the start button 505 (S733). Recording of sequence data also stops (S734). When the user presses the menu button 502 (YES in S735), the main menu is displayed (S736). When the user selects the "save data" command in the main menu (YES in S737), the sequence data is saved or outputted to a user-specified location (S738). When the "end" command is selected by the user (YES in S739), the processing in this flow is ended.

FIG. 12 is a diagram showing an example of sequence data outputted by the information processing device 100 in the present embodiment. In FIG. 12, the data has a structure written in the SMIL (Synchronized Multimedia Integration Language) format. SMIL is a language recommended by the W3C (World Wide Web Consortium) to synchronize the playback of various data formats such as video, audio, and text. In the sequence data example shown in FIG. 12, information not related to temporal behavior is described in the <head> element. The meta attributes of the <head> element define data properties (program title, scene number, take number, rating, remarks/memo, etc.) and are used to assign values to these properties. The layout attribute of the <head> element is used to determine the display position of the object. The description <layout type="text/snnil-basic-layout" ></layout> can be used to apply the default layout value to all objects.

Information related to temporal behavior is described in the <body> element. An object that is played continuously is described under the <seq> element in the child hierarchy. In other words, the sequence of the switched video sources (video clips) is described under the <video> element in the child hierarchy of the <seq> element. Each <video> element uses an src attribute to specify a unique ID that identifies an output file from the video source. A UMID (Unique Material Identifier) defined by SMPTE (Society of Motion Picture and Television Engineers) can be used, for example, for the ID. Alternatively, an src attribute may be specified by the file path to the location where the output file is stored (for example, src="D:\cam1\Clip1.avi"). The switching insertion start position (in-point) of a video clip (an output file from the video source) is specified with the clipBegin attribute, and the insertion end position (out point) is specified by the clipEnd attribute. The clipBegin attribute and the clipEnd attribute can be specified using a time code, for example, clipBegin="hh:mm:ss:ff". If the transition to a video clip is accompanied by a transition effect, it can be described, for example, under the <transition> element. The type attribute of the <transition> element can be used to describe the type of effect, and the dur attribute can be used to describe the duration of the transition.

The data format shown in FIG. 12 is a mere example, and other formats can be used. For example, the data format can be the CSV (Comma Separated Value) format, EDL (Edit Decision List) format, AAF (Advanced Authoring Format), or some newly defined data format. When sequence data is outputted in the EDL (Edit Decision List) format, the data can be retrieved and video edited using an existing video editing application. Typical video editing applications include Premiere Pro from Adobe Inc. of the United States and Final Cut Pro from Apple Inc. of the United States.

FIG. 14 is a diagram showing an example of EDL data. FIG. 14 shows an example in which program recording (recording of sequence data) is started 20 seconds after the start of video data output from each video source. In the figure, 1401 represents the title of the sequence. Also, 1402 indicates whether the time code of the edited sequence is in the drop frame format or the non-drop frame format, 1403 indicates whether the time code of the sequence of the video clip of each video source is the drop frame format or the non-drop frame format, 1404 indicates the shot number, 1405 indicates the ID of the video source, 1406 indicates the configuration is the "audio 2 channel/video" configuration, 1407 indicates the type of switching, 1408 indicates the time code for the in-point of a video clip from the video source, 1409 indicates the time code for the out-point of the video clip from the video source, 1410 indicates the time code for the in-point of an edited video clip (video content), and 1411 indicates the time code for the out-point of the edited video clip (video content). When sequence data is outputted in a compatible data format such as EDL, video content can be created by switching video sources that include network cameras using existing video editing applications.

FIG. 8 is a flowchart showing operations performed by the information processing device 100 in the present embodiment to generate and distribute a playlist based on information indicating which video source was switched at what time. When the browser is launched on the user terminal (PC, tablet, smartphone, etc.) and the URL (Uniform Resource Locator) of a "video content production service" provided by the information processing device 100 in the present embodiment of the invention is inputted, the information processing device 100 displays a home page on the user terminal (display unit) (S801). A "creator login" button is also displayed (S802). When the user presses the "creator login" button (YES in S803), authentication is performed using the user ID and password, etc. (S804). If the authentication result is affirmative (YES in S805), the GUI of a switcher application such as 501 in FIG. 5 is displayed on the user terminal display (S806). When the user presses the plus button 508 (YES in S807), the video sources that can be connected to the network are retrieved and displayed in a list (S808). When one or more video sources have been selected by the user and the list has been closed (YES in S809), video source thumbnails from the selected video sources are displayed in the video source section 507 (S810).

When the user operates the PTZ camera by pressing the camera control button (YES in S811), the camera operating panel 600 is displayed (S812). As mentioned earlier, the camera operating panel 600 has an video display section 601, a "subject tracking" checkbox 602, a "tracking during PGM" radio button 603a, a "do not track during PGM" radio button 603b, a "size setting tracking" checkbox 604, a "set size" pull-down menu 605, an "adjust connection" radio button 606a, a "do not adjust connection" radio button 606b, a close button 607, and a subject designating frame 608. When a touch gesture operation is performed on the video display section 601 by the user (YES in S813), a control command corresponding to the operation is transmitted to control the corresponding PTZ camera (S814). When subject tracking has been set (YES in S815), the corresponding PTZ camera is set to tracking mode (S816). The thumbnail from the corresponding PTZ camera in the video source section 507 then indicates that the tracking mode has been set. When the user presses the close button 607 (YES in S817), the camera operating panel 600 is closed (S818).

When the user presses the start button 505 (YES in S819), a command is sent for outputting the video data to a specific storage area to the video source connected to the user terminal via the network (that is, the video source displayed as a thumbnail in the video source section 507) (S820). Segment data is then generated by subdividing the video data outputted to the storage area (S821). In addition, a playlist is generated that describes the file path referring to the segment data generated from video data from the video source that is being switched (S822), and the playlist is registered and saved in the distribution directory (folder) (S823). At this time, the start button 505 is replaced with the stop button 505-2 (S824). The device then starts generating and recording sequence data that consists of the ID of the video source (or video clip) being switched to at that time and the time (time code) when the switching operation is started (S825). When one of the video source thumbnails is tapped on by the user (YES in S826), the switching time T1 is acquired from the system clock 308 (S827). When the switching type has been set using the switching type button 510 and "cut" has been selected (YES in S828), video from the video source corresponding to the video source thumbnail is displayed in the monitoring section 506 (S829). A red frame is also applied to the thumbnail (S830) to indicate that the corresponding video source has been selected (a so-called "tally display"). Then, the video capturing time attached to the segment data generated from the switched video source is compared with switching time T1, and a playlist is generated in which the file paths of segment data related to the video captured after the time T1 are listed (S831).

When "transition" has been selected as the type of switching using the switching type button 510 (NO in S828), the PGM video displayed in the monitoring section 506 is gradually switched to video (PST) from the video source corresponding to the tapped video source thumbnail at the user-specified duration time (switching time) based on the user-specified effect (switching effect) (S832). A red frame is also applied to the tapped video source thumbnail (S833). Segment data from the previously switched video source (PGM) and the newly switched video source video (PST) captured between time T1 and the duration time (switching time) is processed and synthesized with the user-specified effect (switching effect) specified by the user to generate segment data for switching video (S834), and this is registered and saved in a specific directory (folder) (S835). A playlist is then generated that lists the file paths of the segment data for the switching video (S836). The playlist in the distribution directory (folder) is then overwritten and updated with the newly generated playlist (S837). When the stop button 505-2 is pressed by the user (YES in S838), a command is sent to the connected video source (the video source displayed as a thumbnail in the video source section 507) to stop outputting video data to a specific storage area (S839). In addition, the playlist is described as the final playlist and the playlist in the distribution directory (folder) is overwritten and updated (S840). At this time, the stop button 505-2 is replaced with the start button 505 (S841). Recording of sequence data is also stopped (S842). When the user presses the menu button 502 (YES in S843), the main menu is displayed (S844). When the user has selected the "save data" command in the main menu (YES in S845), the sequence data is saved or outputted to a user-specified location (S846). When the "end" command has been selected by the user (YES in S847), the processing in this flow is ended.

FIG. 13 shows an example of a playlist in m3u format. FIG. 13 shows an example in which Camera_1 is switched to Camera_2 999 seconds (16 minutes 39 seconds) after the start of the program.

The segment data related to video from Camera_1 and Camera_2 are registered and saved in http://www.contentsvision.conn/sannple/ts/camera_1/ and http://www.contentsvision.com/sample/ts/camera_2/ respectively. The number of milliseconds (1/1000) when video related to the data began to be captured is attached to the segment data as the file name.

In the figure, 1301 indicates the file format, 1302 indicates the version number of the file format, 1303 indicates the number of segment data (TS file) in ascending order from the top of the list, 1304 indicates that each segment data (TS file) has been divided in segments of a certain number of milliseconds or less, 1305 indicates the time length of the segment data (TS file) indicated by the file path for the next line, and 1306 represents the file path (URL) to the segment data (TS file).

As explained above, it is possible to deliver video content that switches between a plurality of video sources including network cameras via HTTP streaming. TCP is used to transfer video data via HTTP streaming that enables viewers to view high-quality video content with reduced noise.

(Programmed Camera Work Function)

The programmed camera work function of the information processing device in the present embodiment will now be described. Wedding ceremonies and plays (dramas) usually have pre-prepared progress charts and scenarios, and camera work (switching and PTZ operations) on video content related to wedding ceremonies and plays (dramas) can be performed according to these progress tables and scenarios. Therefore, if a series of camera work operations can be programmed in advance and execution instructions can be issued as the event progresses, mistakes and the burden associated with camera work can be conveniently reduced.

The programmed camera work function of the information processing device in the present embodiment is a function that allows a user to program (input) a series of camera work operations in advance, and sequentially executed the programmed camera works based on user instructions. Camera work instructions are inputted and executed using a programmed camera work panel.

FIG. 9 is a diagram showing an example of a programmed camera work panel. A programmed camera work panel is displayed as a floating window on the display of the switcher terminal 400 when the programmed camera work button 523 is pressed by the user. The programmed camera work panel 901 has a monitoring section 902, a REC button 903, an EDIT button 904, a NEXT button 905, a camera work column 906, an event number column 907, a text column 908, a BACK button 909, a SKIP button 910, and a pop-up 911.

The camera work column 906 is a column showing the camera work in the order of progress. Here, the camera work refers to cut switching or transition switching of video sources or PTZ control of PTZ cameras. The event number column 907 is a column indicating the number in which camera work is executed in temporal order. The text column 908 is a column for displaying text (scenarios, progress tables, scripts, etc.) to serve as a timing guideline when performing camera work. The text that is displayed may be, for example, the lyrics of a song, a scale progression, the number of beats, or the number of measures. This may be entered by the user using an operating unit such as a keyboard, may be retrieved from a file, may be scanned from a paper manuscript or photographed. When the file or manuscript to be retrieved or scanned has a table layout, either the text alone is extracted or the table layout is cut and pasted. A so-called "conte" (storyboard) may also be cut and pasted. The monitoring section 902 is an area for displaying video signals (PGM) from the selected (switched) video source. The REC button 903 is a button used to start recording (sequence data recording). The EDIT button 904 is used to set the mode in which the camera work column and the text column can be edited (change, insertions, deletions, order changes, etc.). The NEXT button 905 is used to execute camera work and move to the next camera work operation. The BACK button 909 is used to return to the previous camera work operation. The SKIP button 910 is used to move beyond the next camera work operation. The pop-up 911 is a "speech bubble" that is displayed near the position of the cursor position in the text and displays a "BS button", "break block button", and a "keyboard button" for editing the text.

The user can place the programmed camera work panel 901 in EDIT mode (editable mode) and set "video source switching (switching)" and "PTZ control" in the camera work column. The camera work executed in the main window (GUI 501 in FIG. 5) is retained as data and can be re-applied in the programmed camera work panel 901 and re-used as programmed camera work. For example, after performing switching or PTZ control in the first take of a certain scene, the camera work can be used as programmed camera work in subsequent takes (retakes), thereby reducing mistakes and the burden of camera work operations.

FIG. 10 is a flowchart showing operations performed by the information processing device 100 in the present embodiment related to the programmed camera work function. When the user has pressed the programmed camera work button 523, the programmed camera work panel 901 is displayed as a so-called floating window (S1001). It is first determined whether there is data related to camera work executed in the main window. If there is such data (YES in S1002), the information processing device 100 compares it with programmed camera work data (camera work data displayed in the programmed camera work panel) (S1003). When the data related to camera work executed in the main window and the programmed camera work data are different (YES in S1004), the message "Do you want the executed camera work to be programmed camera work?" is displayed and the device waits for the user to select YES or NO (S1005). When YES is selected by the user (YES in S1006), the executed camera work is set as programmed camera work and displayed in the camera work column (S1007). When the user presses the EDIT button (YES in S1008), the programmed camera work panel is placed in EDIT mode (S1009). Specifically, the REC button and NEXT button are disabled (grayed out).

When a blank field in the camera work column is tapped by the user in EDIT mode (YES in S1010), a dialog box with "video source switching" and "PTZ" options (radio buttons) are displayed in the field (S1011). However, if a PTZ-capable video source is not assigned to that location in the camera work column, a "PTZ" option cannot be selected (grayout). When "switch video source" is selected (YES in S1012), a dialog box with a pull-down menu is displayed for selecting "cut" and "transition" options (radio buttons) and a video source, as well as a GUI similar to that used in the camera control panel 601 (S1013). When "cut" and one of the video sources has been selected by the user and the angle of the video source after the switching operation has been determined (YES in S1014), a thumbnail showing the cut line, the name of the video source, and the viewing angle of the video source after the switching operation has been performed is added to and displayed in the camera work column (S1015).

When the user has selected "transition" and one of the video sources, and the viewing angle of the video source after the switching operation has been determined (YES in S1016), a thumbnail showing the cut line, the name of the selected video source, and the viewing angle of the video source after the switching operation has been performed is added to and displayed in the camera work column (S1017). A band indicating the transition period, a combo box indicating the switching time, and an icon indicating the type of transition effect are also displayed (S1018). The combo box indicating the switching time and the icon indicating the type of transition effect include the default values. The user can change these values by tapping on the combo box or the icon. Both dialog boxes have a cancel or close button, and the dialog box returns the screen to the previous state when the user presses the cancel or close button.

When "PTZ" has been selected by the user (YES in S1019), a PTZ dialog box with the same GUI as the camera control panel 601 is displayed (S1020). When the user performs a GUI operation in the PTZ dialog box to determine the viewing angle after the PTZ operation has been performed (YES in S1021), a band indicating the cut line and the PTZ, a combo box indicating the switching time, and a thumbnail indicating the viewing angle after the PTZ operation has been performed are displayed in the camera work column (S1022). The combo box indicating the switching time includes the default value. The user can change this value by tapping on the combo box.

When the user presses and holds the text column (YES in S1023), the cursor is displayed in the text (S1024). It also displays a pop-up (speech balloon) (S1025). The pop-up has a BS button, a break block button, and a keyboard button. When the BS button is pressed by the user (YES in S1026), a backspace operation (BackSpace) is performed to delete the character in front of the cursor (S1027). If the target of deletion target is a "cut line" instead of a character, the text in the text block where the cursor is located is combined with the previous text block, and the text block corresponding to the next event number and those thereafter are shifted backward by one. When the user presses the break block button (YES in S1028), the text following the cursor position in the text block moves to the newly created block immediately following the text block, and the text blocks corresponding to the next event number and those thereafter are shifted forward by one (S1029). When the user presses the keyboard button (YES in S1030), a floating keyboard is displayed to allow text to be inserted (S1031).

When the user presses the menu button (YES in S1032), the menu is displayed (S1033). The menu includes the commands "retrieve text", "save programmed camera work data", and "retrieve programmed camera work data". When the user selects "retrieve text" (YES in S1034), the file retrieval window is displayed (S1035). The file retrieval window has "overwrite" and "insert" options (radio buttons) as well as "OK" and "cancel" buttons. If no file is selected in the window, the "OK" button is disabled (grayed out). When "overwrite" has been selected by the user and a file has been retrieved (YES in S1036), all of the text in the text field is overwritten with text from the retrieved file (S1037). When "insert" has been selected by the user and a file has been retrieved (YES in S1038), the text in the retrieved file is inserted at the location of the cursor (S1039). When the user selects "save programmed camera work data" (YES in S1040), the save data window is displayed (S1041).

When the user has selected "retrieve programmed camera work data" (YES in S1042), the data file retrieval window is displayed (S1043). The data file retrieval window has a "retrieve executed camera work" checkbox as well as "OK" and "cancel" buttons. If the check box has not been checked or a file has not been selected in the window, the "OK" button is disabled (grayed out). When the checkbox has been checked, file selection in the window is disabled (grayed out). When the camera work data has been retrieved (YES in S1044), the camera work field is overwritten (S1045).

When the user ends the EDIT mode (when the EDIT button displayed in a depressed state is tapped again) (YES in S1046), the programmed camera work panel is placed in run mode (S1047). Specifically, the REC button and NEXT button are enabled. When the user taps the NEXT button (YES in S1048), the camera work in the selected row is performed and the process moves to the next row (S1049). When the camera work in the last line is executed (YES in S1050), no lines are left and the NEXT button is disabled (grayed out) (S1051). When the REC button is tapped by the user (YES in S1052), REC is started (S1053). The operations during REC are the same as those when REC is selected in step S711 of FIG. 7. When the user taps the "camera work column", the "event number column", or the "text column" (YES in S1054), the operation shifts to the line itself (S1055). When the close button is pressed by the user or any part of the main panel is tapped (YES on S1056), the programmed camera work panel is closed (S1057). Note that starting REC and stopping REC and display or non-display of the programmed camera work panel are independent of each other. For example, REC will continue if REC is in progress when the programmed camera work panel is closed.

Data used to save and retrieve programmed camera work is assigned a number (event number) for video source switching and PTZ control and associated with progress table text and content temporally. Since all sequence data includes the "switching of video sources", the sequence data format may be expanded and used. An example of extending sequence data in SMIL (Synchronized Multimedia Integration Language) format to include programmed camera work data will now be described.

First, an event_Num attribute is added to each <video> element to indicate the order in which the camera work is to be executed (event number).

<video src="D:\cam1\Clip1.nnxf" clipBegin="hh:mm:ss:ff" clipEnd="hh:nnnn:ss:ff" event_Nunn="1"/>

Also, the PTZ control is described, for example, as an <onvif> element in the child hierarchy of the <seq> element.

<onvif CamID="cann1" AbsolutePanTilt="X,Y" AreaZoom="x,y,w,h" dur="hh:nnnn:ss:ff" event_Num="2"/>

Text (such as a progress table or a script) that serves as a guideline for the camera work execution timing is added as a <text_block> element in a manner corresponding to the order in which the camera work is to be executed (event number).

<text_block="Thank you everyone for coming to the wedding reception today. The bride and groom will now enter. Please welcome them with a big applause." event_Nunn="1"/>

As mentioned earlier, the user can program a series of camera work operations in advance and use the NEXT button to execute them successively in a preset order. In this way, mistakes and the burden of performing camera work operation can be reduced. The user can also set the timing for camera work execution instructions in reference to a progress table or a script, further improving operability. The camera work executed in the main window can also be used as programmed camera work. This reduces the time and effort required to program (enter and set) camera work. In addition, text (scenarios, progress charts, scripts, song lyrics, storyboards, musical scores, etc.) can be used to explain the video contents and plans, recruit collaborators and staff, and thank advertisers. In this way, a platform can be built and operated for planning, financing, production, and distribution, etc., centered on the creation of video content. Also, when the camera work programmed is executed and video content created in contrast to text (a scenario, progress chart, script, song lyrics, storyboard, musical score, etc.), text can be used to notify advertisers, collaborators, or to make some or all of the produced video content accessible. When this is done, the notification and access to some or all of the video content (playback, viewing, confirmation, etc.) can be used to encourage action on the part of advertisers, collaborators, and staff, etc. to expedite projects related to video content production and distribution.

(Creating Video Content)

When the information processing device 100 in the present embodiment switches between a plurality of video sources to record an event in the manner described above, video clips that record video signals from video sources and sequence data that refers to the switched portions of video clips in switching order are created. Because the sequence data also has the properties of a "playlist" indicating the playback order of the plurality of video clips (parts), the video clips (parts) can be played back on video player according to the sequence data to view video content of the recorded event. When the sequence data is written in SMIL format, video content can be played using a web browser as the video player. If the sequence data is in a data format that can be read by a video editing device (video editing application), video content of the recorded event can be exported (outputted) as a single video file using the video clips from the video sources as data.

Because sequence data is generated for each recording (one take per scene), the sequence data for each scene should be compatible with other scenes when the video content consists of multiple scenes (combined sequence data). For example, in the example of sequence data shown in FIG. 12 (an example of sequence data written in SMIL format), multiple scenes are combined in a playlist that is played back in the order of the scene number when the elements in the hierarchy below the <body> element are combined in the "scene number" order mentioned in the meta attribute of the <head> element.

Also, when scenes are "retaken" and there are multiple takes for each scene, video content consisting of scenes from takes desired by the user can be viewed and played back if the "rating" included in the meta attribute of the <head> element is used to combine takes (later takes in the case of multiple takes) with the highest rating value to compile a "playlist" in scene number order. In cases where it is common to do "retakes" as in the video content for dramas, the process of determining which take to adopt for each scene during the video editing process can be streamlined. Because text editing of sequence data (including combined data) has the same effect as video editing, the configuration and resources required by video editing devices (video editing applications) can be simplified and streamlined. For example, a web page with a text area for editing SMIL and a monitoring area for playing and displaying the SMIL makes it possible to configure a web application for video editing. Also, if the information processing device 100 in the present embodiment refers to a file in which sequence data is written on the video server side and sequentially transmits video composed of the parts of video clips with written video source data that has been switched by the information processing device 100 based on this data, live distribution can be performed (with a bit of a delay) during event recording (sequence data writing).

The information processing device 100 in the present embodiment performs video source switching based on near real-time live view video transferred via a method that transfers data without confirming reception by the receiving node with the node transmitting from one of a plurality of video sources including the network cameras, and creates and distributes video content based on information on which video source was switched at what time and on video data outputted from those video sources. By using this configuration, video content can be created and distributed using video data as material with little deterioration in quality due to network transmission while switching video sources in near real time according to the progress of an "event" such as a ceremony or drama. In this way, work such as line setting and equipment costs can be reduced, and video content can be produced simply, quickly, and inexpensively. In other words, an information processing device suitable for creating and distributing video content by switching between video sources including network cameras can be realized.

Other Embodiments

The present invention is not limited to the embodiment described above, and various modifications and alterations are possible without departing from the scope and spirit of the present invention.

The present invention also supplies software (a program) via a network or various storage media to realize the functions of the embodiment described above in a system or device. These functions are realized by processing performed by the computer (or CPU, MPU, etc.) in the system or device to retrieve and execute the program. Therefore, in order to realize the function processing of the present invention in a computer, the program code itself installed on the computer must realize the present invention. In other words, the present invention also includes the computer program itself that realizes the function processing of the present invention. In this case, the program functions may take the form of object code, a program executed by an interpreter, a script or macro executed by an application program such as a web browser, or an API (Application Programming Interface). This may also be incorporated and implemented as a part of another web service such as an SNS (Social Networking Service) using a web programming technique known as a "mashup". The present invention can also be realized as a web application using a web browser. Therefore, a web server located by the URL (Uniform Resource Locator) constitutes an embodiment of the present invention regardless of whether the server is a single piece of hardware.

KEY TO THE DRAWINGS

100: Information processing device
110: CPU
120: RAM
130: ROM
160: Display
170: Operating unit
180: Internal bus
190: Network interface
210: Event
400: Switcher terminal
1500: Video sources such as network cameras
1600: Viewer terminal
301: Storage means
302: Communication means
303: Segment data generating means
304: Playlist generating means
305: Playlist distributing means
306: Segment data distributing means
307: Switcher means
308: System clock
401: Video source thumbnail displaying means
402: Menu displaying means
403: Volume level displaying means
404: REC indicator displaying means
405: Sequence recording start/end control means
406: PGM video displaying means
407: Video source search/addition/deletion means
408: Switching means
409: Camera control means
410: Transition means
411: Property means
412: Device setting means
413: System clock
414: Sequence data output means
415: Programmed camera work means
416: Camera work executing means
501: GUI
502: Menu buttons
503: Audio meter
504: ON AIR indicator
505: Start button
506: Monitoring section
507: Video source section
508: Plus button 509: Camera control button
510: Switching type button
511: Rating button
512: Timeline area
513: Comment area
514: Timecode scale
515: Video source thumbnail display area
516: Play button
517: Sequence marker
518: Property button
519: Magnification slider
520: Fader
521: Scene title combo box
522: Take number text box
523: Programmed camera work buttons
524: Transition effect pull-down
525: Duration time up/down
600: Camera operating panel
601: Video display section
602: "Subject tracking" checkbox
603a: "Tracking during PGM" radio button
603b: "Do not track during PGM" radio button
604: "Size setting tracking" checkbox
605: "Set size" pull-down
606: "Adjust connection" checkbox
607: Close button
608: Subject designating frame
609: Pan/tilt controller
610: Zoom controller
611: Focus controller
612: Settings menu buttons
901: Programmed camera work panel
902: Monitoring section
903: REC button
904: EDIT button
905: NEXT button
906: Camera work column
907: Event number column
908: Text column
909: BACK button
910: SKIP button
911: Pop-up (speech balloon)
1510: CPU (camera)
1520: RAM (camera)
1530: ROM (camera)
1540: Imaging unit (camera)
1550: Memory interface (camera)
1560: Network interface (camera)
1570: PTZ control unit (camera)
1580: External interface (camera)
1590: Internal bus (camera)
1601: Viewer terminal communication means
1602: Playlist acquiring means
1603: Segment data acquiring means
1604: Buffer means
1605: Playback means

The invention claimed is:

1. An information processing device that performs information processing to output video content using video from multiple video sources including one or more pan-tilt-zoom (PTZ)-enabled network cameras, the information processing device comprising:
a screen configured to display video content;
a processor communicatively coupled to a receiving node and a transmitting node, each of the receiving node and the transmitting node communicatively coupled to a computer network; and
a storage media communicatively coupled to the processor and storing program code, that when executed by the processor, causes the processor to:
execute switching of a video source based on video signals from the multiple video sources transferred to the processor via the computer network and the receiving node, wherein transferring the video signals to the processor comprises transferring to the processor video data without confirming reception by the receiving node with the transmitting node at the video source, the video source comprising a PTZ-enabled network camera selected from the one or more PTZ-enabled network cameras;
track automatically a specific subject in a PTZ operation, the PTZ operation comprising detecting one or more moving objects in a video comprising video data transferred to the processor without confirming reception by the receiving node with the transmitting node at the PTZ-enabled network camera;
perform PTZ control of the PTZ-enabled network camera so that a detected moving object in the video is kept near a center of the screen; and
output new video content comprising a new set of video data by a data transmission from the transmitting node that continues to retransmit the new set of video data until notification of a reception by the receiving node has been confirmed based on information indicating (1) which video source of the video signals of the multiple video sources received at the receiving node was switched, (2) at what time, and (3) based on video data as outputted from the multiple video sources as received at the receiving node.

2. The information processing device according to claim 1, further comprising a touch display, wherein the program code, when executed by the processor, further causes the processor to: perform a transition with a switching effect, the transition occurring upon a transition instruction issued based on a touch gesture on the touch display.

3. The information processing device according to claim 1, wherein the PTZ-enabled network camera is configured to perform at least pan, tilt, and zoom operations according to a set of pan/tilt/zoom computing instructions.

4. The information processing device according to claim 3, wherein the program code comprises the set of pan/tilt/zoom computing instructions.

5. The information processing device according to claim 3, further comprising a touch display means, wherein pan/tilt/zoom controls can be performed by a touch gesture on the touch display means.

6. The information processing device according to claim 1, further comprising a programmed camera work means for pre-programming a series of sets of camera work, and a camera work executing means for sequentially executing camera work programmed by the programmed camera work means based on a user instruction.

7. A method comprising:
executing switching of a video source based on video signals from multiple video sources transferred to a processor of an information video processing device via a computer network and a receiving node, wherein transferring the video signals to the processor comprises transferring to the processor video data without confirming reception by the receiving node with a transmitting node at the video source, the video source comprising a pan-tilt-zoom (PTZ)-enabled network camera selected from one or more PTZ-enabled network cameras;

tracking automatically a specific subject in a PTZ operation, the PTZ operation comprising detecting one or more moving objects in a video comprising video data transferred to the processor without confirming reception by the receiving node with the transmitting node at the PTZ-enabled network camera;

performing PTZ control of the PTZ-enabled network camera so that a detected moving object in the video is kept near a center of a screen; and outputting new video content comprising a new set of video data by a data transmission from the transmitting node that continues to retransmit the set of video data until notification of a reception by the receiving node has been confirmed based on information (1) indicating which video source of the video signals of the multiple video sources received at the receiving node was switched, (2) at what time, and (3) based on video data as outputted from the multiple video sources as received at the receiving node.

8. A tangible, non-transitory computer-readable medium storing a program that when executed by a processor, causes a processor to:

execute switching of a video source based on video signals from multiple video sources transferred to the processor via a computer network and a receiving node, wherein transferring the video signals to the processor comprises transferring to the processor video data without confirming reception by the receiving node with a transmitting node at the video source, the video source comprising a pan-tilt-zoom (PTZ)-enabled network camera selected from one or more PTZ-enabled network cameras;

track automatically a specific subject in a PTZ operation, the PTZ operation comprising detecting one or more moving objects in a video comprising video data transferred to the processor without confirming reception by the receiving node with the transmitting node at the PTZ-enabled network camera;

perform PTZ control of the PTZ-enabled network camera so that a detected moving object in the video is kept near a center of a screen; and output new video content comprising a set of new video data by a data transmission from the transmitting node that continues to retransmit the set of video data until notification of a reception by the receiving node has been confirmed based on information (1) indicating which video source of the video signals of the multiple video sources received at the receiving node was switched, (2) at what time, and (3) based on video data as outputted from the multiple video sources as received at the receiving node.

* * * * *